United States Patent
Klug et al.

(10) Patent No.: US 6,615,251 B1
(45) Date of Patent: Sep. 2, 2003

(54) METHOD FOR PROVIDING NODE TARGETED CONTENT IN AN ADDRESSABLE NETWORK

(76) Inventors: John R. Klug, 5801 Bluebell La., Evergreen, CO (US) 80439; Noah H. Klug, 5801 Bluebell La., Evergreen, CO (US) 80439

( * ) Notice: Subject to any disclaimer, the term of this patent is extended or adjusted under 35 U.S.C. 154(b) by 0 days.

(21) Appl. No.: 09/451,390

(22) Filed: Nov. 30, 1999

Related U.S. Application Data

(63) Continuation-in-part of application No. 09/128,915, filed on Aug. 4, 1998, and a continuation-in-part of application No. 08/876,765, filed on Jun. 16, 1997, now Pat. No. 5,996,007, said application No. 09/128,915, is a continuation of application No. 08/595,837, filed on Feb. 2, 1996, now Pat. No. 5,790,785.
(60) Provisional application No. 60/008,736, filed on Dec. 11, 1995.

(51) Int. Cl.⁷ ............................................. G06F 15/16
(52) U.S. Cl. .................................. 709/218; 709/224
(58) Field of Search ................................. 709/217, 218, 709/219, 224

(56) References Cited

U.S. PATENT DOCUMENTS

| | | | |
|---|---|---|---|
| 4,766,293 A | 8/1988 | Boston .......................... 235/379 |
| 5,001,628 A | 3/1991 | Johnson et al. .............. 364/200 |
| 5,235,642 A | 8/1993 | Wobber et al. ................ 380/25 |
| 5,241,594 A | 8/1993 | Kung ............................. 380/4 |
| 5,263,158 A | 11/1993 | Janis ........................... 395/600 |
| 5,305,195 A | 4/1994 | Murphy ........................ 364/401 |
| 5,455,953 A | 10/1995 | Russell ........................ 395/739 |
| 5,469,576 A | 11/1995 | Dauerer et al. .............. 395/186 |
| 5,481,720 A | 1/1996 | Loucks et al. .............. 395/700 |
| 5,506,961 A | 4/1996 | Carlson et al. .............. 395/186 |
| 5,515,490 A | 5/1996 | Buchanan et al. ........... 395/154 |
| 5,544,322 A | 8/1996 | Cheng et al. ........... 395/200.12 |
| 5,572,643 A | 11/1996 | Judson ........................ 395/200 |
| 5,586,260 A | 12/1996 | Hu ........................... 395/200.2 |
| 5,590,197 A | 12/1996 | Chen et al. .................... 380/24 |

(List continued on next page.)

OTHER PUBLICATIONS

"C&WC Lays Out Interactive TV Plans," Computer Program International, CGN08200041, ComputerWire Inc., (Aug. 20, 1998), 1 page.

"NCR: NCR & Quadstone Help Banks Improve Service and Reduce Risk by Better Predicting Customer Behaviour," M2 Presswire, M2 Communications, Ltd., (Jul. 6, 1998), 2 pages.

Taylor, Catharine P., "Interstitial Ads Make an Appearance," *Interactive Week* (*Cybermedia Online Contents, Services and Communications*), (May 19, 1997), p. 29.

(List continued on next page.)

*Primary Examiner*—David Wiley
*Assistant Examiner*—Phuoc Nguyen
(74) *Attorney, Agent, or Firm*—Dorsey & Whitney LLP

(57) ABSTRACT

Advertising, entertainment or other content is targeted to a particular node of an addressable network based on user information. Such addressable networks may include the Internet, certain television networks or other networks where content can be addressed to specific nodes. The user information may include financial information, product or service preference information, and user contact information regarding a user of the targeted node. In one implementation, targeted content is presented during waiting time of an Internet session. The corresponding process involves monitoring (416) a user node to identify a website access request, accessing (418) a previously stored message said, selecting (432) a message from the message set and displaying or playing back (434) the selected message.

21 Claims, 24 Drawing Sheets

U.S. PATENT DOCUMENTS

| | | | |
|---|---|---|---|
| 5,604,490 A | 2/1997 | Blakley, III et al. | 340/825.31 |
| 5,611,048 A | 3/1997 | Jacobs et al. | 395/200.09 |
| 5,619,574 A | 4/1997 | Johnson | 380/25 |
| 5,642,515 A | 6/1997 | Jones et al. | 395/727 |
| 5,657,450 A | 8/1997 | Rao et al. | 395/610 |
| 5,664,948 A | 9/1997 | Dimitriadis et al. | 434/307 |
| 5,671,354 A | 9/1997 | Ito et al. | 395/187.01 |
| 5,678,041 A | 10/1997 | Baker et al. | 395/609 |
| 5,682,428 A | 10/1997 | Johnson | 380/23 |
| 5,682,478 A | 10/1997 | Watson et al. | 395/200.12 |
| 5,689,638 A | 11/1997 | Sadovsky | 395/188.01 |
| 5,692,049 A | 11/1997 | Johnson et al. | 380/25 |
| 5,694,595 A | 12/1997 | Jacobs et al. | 395/609 |
| 5,696,824 A | 12/1997 | Walsh | 380/24 |
| 5,708,780 A | 1/1998 | Levergood et al. | 395/200.12 |
| 5,708,828 A | 1/1998 | Coleman | 395/785 |
| 5,729,689 A | 3/1998 | Allard et al. | 395/200.58 |
| 5,737,619 A | 4/1998 | Judson | 395/761 |
| 5,740,549 A | 4/1998 | Reilly et al. | 705/14 |
| 5,757,920 A | 5/1998 | Misra et al. | 380/25 |
| 5,765,152 A | 6/1998 | Erickson | 707/9 |
| 5,768,504 A | 6/1998 | Kells et al. | 395/187.01 |
| 5,768,508 A | 6/1998 | Eikeland | 395/200 |
| 5,774,551 A | 6/1998 | Wu et al. | 380/25 |
| 5,781,894 A | 7/1998 | Petrecca et al. | 705/14 |
| 5,787,254 A | 7/1998 | Maddalozzo, Jr. et al. | 395/200.58 |
| 5,790,785 A | 8/1998 | Klug et al. | 395/188.01 |
| 5,794,210 A | 8/1998 | Goldhaber et al. | 705/14 |
| 5,801,698 A | 9/1998 | Lection et al. | 345/347 |
| 5,805,815 A | 9/1998 | Hill | 395/200 |
| 5,809,144 A | 9/1998 | Sirbu et al. | 380/25 |
| 5,809,237 A | 9/1998 | Watts et al. | 395/200.32 |
| 5,809,242 A | 9/1998 | Shaw et al. | 395/200 |
| 5,812,784 A | 9/1998 | Watson et al. | 38/200.57 |
| 5,813,009 A | 9/1998 | Johnson et al. | 707/100 |
| 5,848,397 A | 12/1998 | Marsh et al. | 705/14 |
| 5,848,412 A | 12/1998 | Rowland et al. | 707/9 |
| 5,854,897 A | 12/1998 | Radziewicz et al. | 395/200.54 |
| 5,855,007 A | 12/1998 | Jovicic et al. | 705/14 |
| 5,866,889 A | 2/1999 | Weiss et al. | 235/379 |
| 5,884,312 A | 3/1999 | Dustan et al. | 707/10 |
| 5,890,140 A | 3/1999 | Clark et al. | 705/35 |
| 5,913,040 A | 6/1999 | Rakavy et al. | 395/200.62 |
| 5,915,243 A | 6/1999 | Smolen | 705/14 |
| 5,918,224 A | 6/1999 | Bredenberg | 707/2 |
| 5,933,811 A | 8/1999 | Angles et al. | 705/14 |
| 5,944,794 A | 8/1999 | Okamoto et al. | 709/225 |
| 5,946,664 A | 8/1999 | Ebisawa | 705/14 |
| 5,948,061 A * | 9/1999 | Merriman et al. | 705/14 |
| 5,974,451 A | 10/1999 | Simmons | 709/218 |
| 5,983,351 A | 11/1999 | Glogau | 713/201 |
| 5,991,799 A | 11/1999 | Yen et al. | 709/218 |
| 5,999,912 A | 12/1999 | Wodarz et al. | 705/14 |
| 6,003,076 A | 12/1999 | Maruyama et al. | 709/223 |
| 6,011,537 A * | 1/2000 | Slotznick | 345/700 |
| 6,029,195 A | 2/2000 | Herz | 709/219 |
| 6,058,378 A | 5/2000 | Clark et al. | 705/37 |
| 6,058,393 A | 5/2000 | Meier et al. | 707/10 |
| 6,073,105 A | 6/2000 | Sutcliffe et al. | 705/1 |
| 6,094,677 A | 7/2000 | Capek et al. | 709/219 |
| 6,131,810 A | 10/2000 | Weiss et al. | 235/379 |
| 6,138,162 A | 10/2000 | Pistriotto et al. | 709/229 |
| 6,148,332 A | 11/2000 | Brewer et al. | 709/218 |
| 6,173,287 B1 | 1/2001 | Eberman et al. | 707/102 |
| 6,185,586 B1 | 2/2001 | Judson | 707/513 |
| 6,199,106 B1 | 3/2001 | Shaw et al. | 709/217 |
| 6,223,188 B1 | 4/2001 | Albers et al. | 707/501 |
| 6,240,555 B1 | 5/2001 | Shoff et al. | 725/110 |
| 6,247,047 B1 * | 6/2001 | Wolff | 705/14 |
| 6,308,202 B1 * | 10/2001 | Cohn et al. | 705/27 |
| 6,311,211 B1 | 10/2001 | Shaw et al. | 709/206 |

OTHER PUBLICATIONS

Kennedy, James, "Opinion–Is 'Irritainment' Good for Advertisers?" *World Internet Advertising Report*, http://www.internet.com, Mecklermedia Corp. (1996), 4 pages.

Hill, G. Christian, May 27, 1997, Wall Street Journal, Group of Firms Propose Standard For Privacy on Net, 2 pages.

Internet Pathfinder, E–Nail News Web—Business News, Internet Leaders to Offer Privacy Protection, 2 pages.

Internet, Netscape, Firefly and VeriSign Propose Open Profiling Standard (OPS) to Enable Broad Personalization of Internet Services, 3 pages.

Advertisement in 1995 by Internet Profiles Corporation on the World Wide Web, at Website URL:http://www.ipro.com.

McMahon, P.V., Feb. 16–17, 1995, "Sesame V2 Public Key & Authorization of Kerberos", IEEE, pp. 114–130.

Trostle, J.T., Feb. 22–23, 1996, "A Flexible Distributed Authorization Protocol", IEEE, pp. 43–52.

* cited by examiner

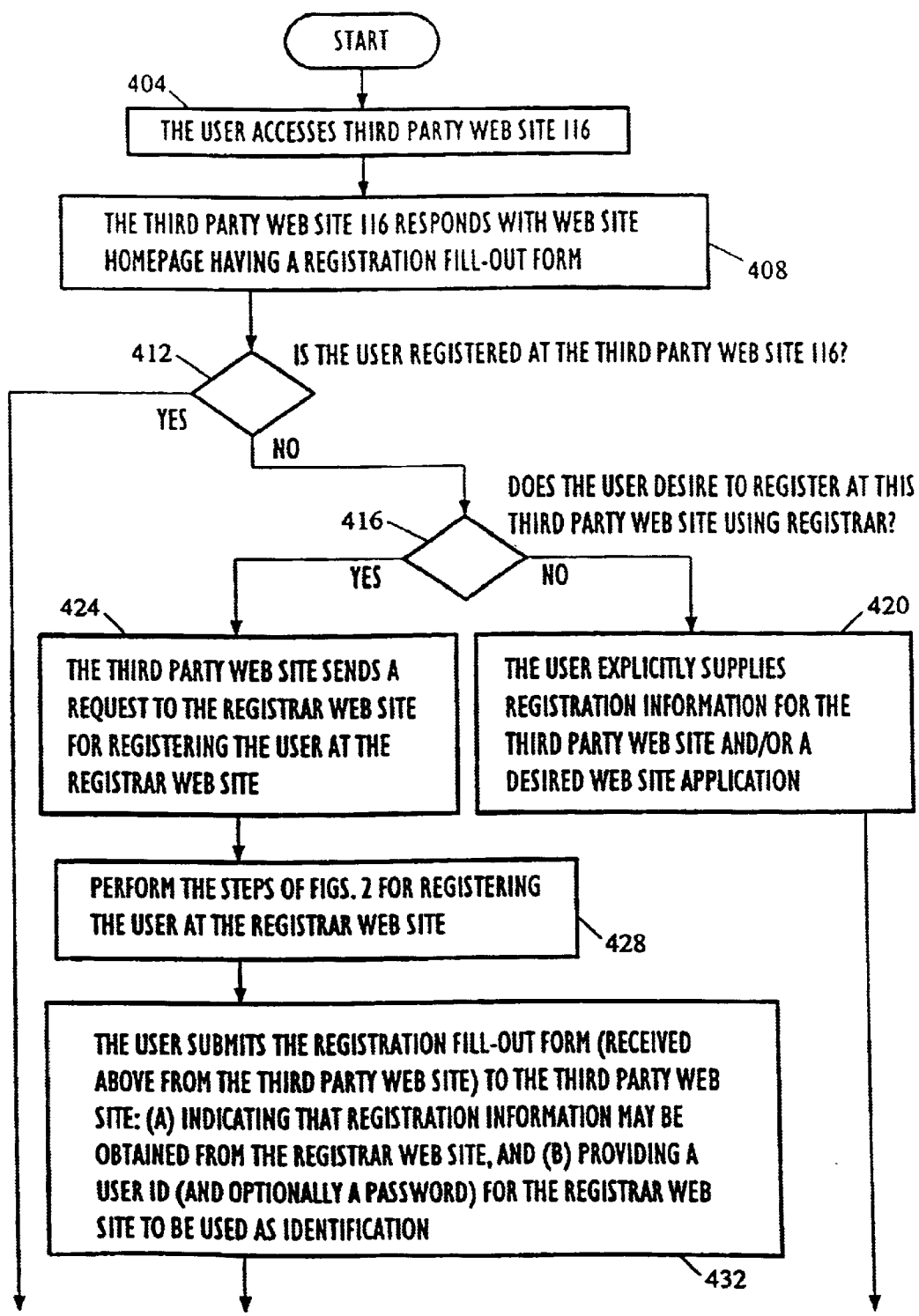
FIG. 8A THE USER REGISTERS AT THE REGISTRAR WEB SITE WHEREIN A THIRD PARTY WEB SITE IS FIRST ACCESSED FIG. 9 REGISTRATION TRANSMISSION PROCESS BETWEEN REGISTRAR WEB SITE AND THIRD PARTY WEB SITE (MAY BE INVOKED BY FIGS. 4)
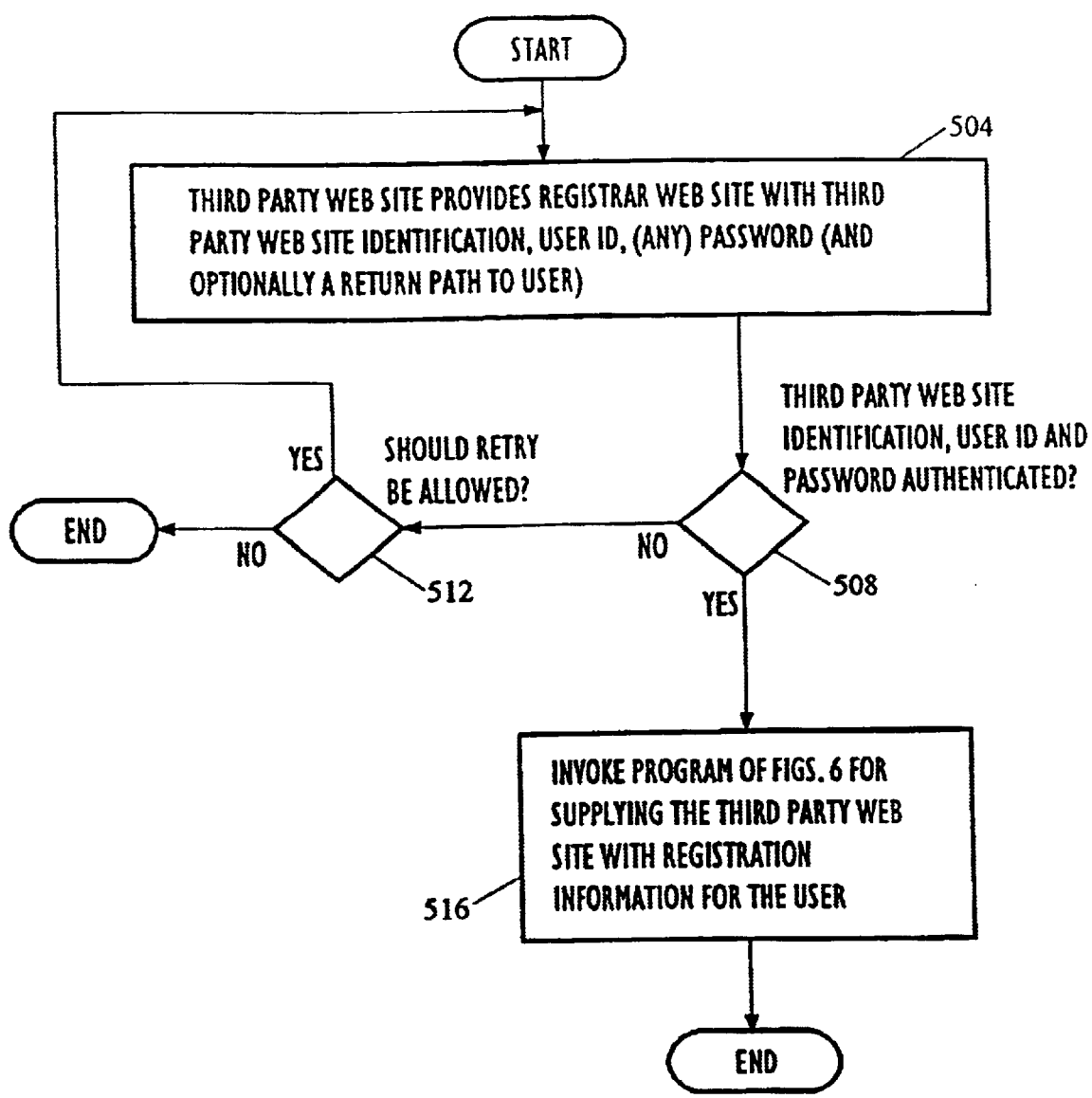

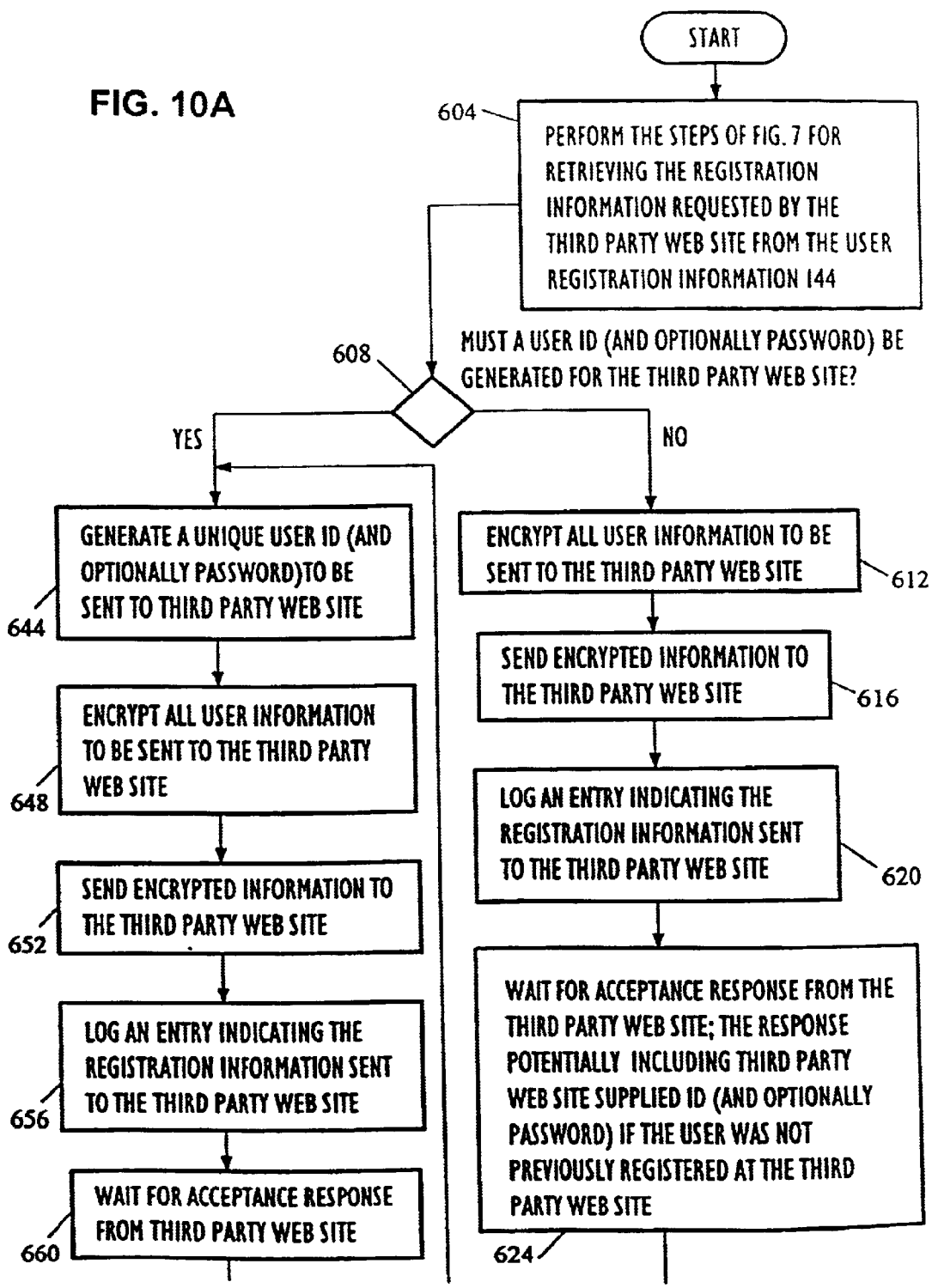

METHOD FOR PROVIDING NODE TARGETED CONTENT IN AN ADDRESSABLE NETWORK

RELATED APPLICATION

This application is a continuation-in-part of U.S. patent application Ser. No. 08/876,765 filed Jun. 16, 1997 (now U.S. Pat. No. 5,996,007) and is also a continuation-in-part of U.S. patent application Ser. No. 09/128,915 filed Aug. 4, 1998, which is a continuation of U.S. patent application Ser. No. 08/595,837 filed Feb. 2, 1996 (now U.S. Pat. No. 5,790,785), which in turn claims priority from a provisional application filed Dec. 11, 1995 and assigned provisional Serial No. 60/008,736.

FIELD OF THE INVENTION

The present invention relates in general to interactive communication networks such as the Internet or other public or private networks (generically the "Internet") and, in particular, to providing user targeted content including content initially displayed or otherwise presented during interval and/or dead time ("waiting time") of an Internet session, e.g., during processing time associated with the exchange of information between the Internet content providers and Internet content users.

BACKGROUND OF THE INVENTION

In recent years, public participation in the Internet has expanded at a rate that has, at times, surprised industry analysts and service providers. This expansion has not escaped the attention of the business community who is actively searching for ways to capitalize on this medium of ever-increasing importance. In the attempt to quickly respond to this phenomenon, the business community and its promotional and advertising consultants have sometimes analogized the Internet to more familiar media in order to analyze business opportunities and apply accumulated experience and wisdom to the unfamiliar and poorly understood new medium. In this regard, some have viewed the Internet as a form of electronic publishing and have focused on printed media as an instructive business paradigm. Others, focusing on the dynamic voice and image potential of Internet communications, have viewed broadcast media as the most instructive source of business experience.

A result of this current tendency to analyze business opportunities on the Internet in view of experiences with more familiar media is that initial advertising efforts on the Internet have closely resembled traditional advertisements in appearance, format and function. Among the most common Internet advertisements are so-called banner advertisements. These advertisements typically appear in high traffic areas such as the home page of a browser, search engine or website, and appear to the user as an area or banner occupying a portion of the monitor working area or graphical desktop. These banners are typically designed much like advertisements in the printed media using well-established principles intended to draw attention away from the primary content to the banner and maximize public response. Others have proposed video or audiovisual commercials in the television style. Such commercials, as in television, would interrupt and be interspersed with the flow of information over the Internet.

Such approaches have not been fully effective. The television style advertisement proposals have met great resistance and, in general, have not been implemented by wary service providers. Banner advertisements have also been quite limited in effectiveness. In either case, although traditional demographic projections have sometimes been used to target classes of consumers (e.g., advertisements for investment services on business information sites), advertisements are often not of interest to specific Internet users and response rates are low. As a result, an exaggerated but common lament in the business community today is that nobody is making money by advertising on the Internet.

SUMMARY OF THE INVENTION

The present invention is based, in part, on a recognition that the Internet as a medium is intrinsically different from traditional media in ways that demand new business approaches. In particular, conventional advertising techniques largely ignore the interactive basis of the Internet and are therefore subject to certain pitfalls and/or fail to take advantage of certain opportunities of the interactive environment. Examples of business factors peculiar to this interactive environment include the following:

users who select to participate in the Internet medium tend to be interested in retaining control over their Internet sessions and, therefore, often ignore and even resent advertisements that are pushed onto their desktops and interrupt their sessions or intrude on their desktop areas;

although attempts have been made, with some success, to convert the Internet medium to a push medium, content is not typically broadcast over the Internet, but rather, is usually pulled down or retrieved by identifiable users; and the interactive nature of Internet communications results in waiting times associated with data transmission where the user may be more readily engaged in a manner that is unobtrusive.

These and other factors of the interactive environment are an important basis of the present invention. In particular, the ability to specifically direct advertisements and other content, including entertainment, to users based on user information is an important advantage of the present invention.

According to one aspect of the present invention, selected messages are provided at a user node that are initiated during a waiting time of an Internet session. The messages can be, for example, promotional or advertising content, product information, a public service announcement or other messages of possible interest to the user. The associated process involves providing a selection of messages, monitoring a user node during an Internet session to identify a website access request, selecting a message from the selection of messages and displaying the message at the user node during a waiting time related to the website access request. The waiting time relates to a time interval during which the user node communicates with a server of the requested site and associated set up periods. Preferably, the waiting time during which messages are displayed fall within the time period beginning when the user selects a site and ending upon initiation of site display on the user's desktop. The selection of messages is preferably provided by storing the selection at the user node, e.g, on the user's hard drive or in cache, in a local area network of the user, or otherwise in storage accessible by the user without Internet communication. This selection is stored, for example, prior to an Internet session or as an explicit or background function of a browser service or searching engine during an Internet session. A selection may be stored only for use during a particular session or may be saved for use in subsequent sessions.

The website access request can be identified in a variety of ways. For example, operating system messages may be monitored to identify a "mouse down" message having desktop coordinates corresponding to a hot link area of the desktop. Keyboard messages may be monitored to identify entry of a URL address or the like. Alternatively, protocol communications such as TCP/IP or HTTP communications of the browser may be monitored to identify a header message associated with a site access request. Upon identifying such an access request, a message can be selected and played at the user node. The message may be selected automatically by logic implementing the process of the present invention, or the user may be allowed to select from message choices, e.g., displayed in a menu or graphically presented in the format of a room or gallery through which the user may peruse.

According to another aspect of the present invention, waiting time messages are terminated at the end of the waiting time so as to minimize Internet session intrusion. The associated process involves providing a waiting time message such as described above, monitoring communications relating to loading of a requested website to identify a selected status relative to the loading, and terminating playback of the waiting time message based on the identified status. In one implementation, the monitored communications are protocol or other communications between a browser and a server of the selected website. Alternatively, operation of the browser may be monitored to obtain an indication relating to loading status. As a further alternative, operating system messages may be monitored relative to website display status. Playback of the waiting time messages can be terminated, for example, upon receiving an indication that a website page is ready for preliminary, intermediate or complete display. In this regard, the user can preferably set the message program so that messages terminate when loading reaches a selected level, e.g., 25%, 50%, or 100% complete.

According to another aspect of the present invention, waiting time or other messages are selected based on user information. Preferably at least a portion of such user information is obtained by voluntary participation of the user. Credit towards free Internet access time or other value may be provided as an incentive to and reward for user participation. For example, the user may provide information relative to the demographics, psycho graphics, product interests and lifestyle of the user upon registering to participate in awaiting time message program. Such information may have already been made available by the user at a separate registration site. Alternatively, information regarding the user may be obtained based on a site access request, a history of Internet usage, or other information that may be derived by monitoring the user node. Additionally, stored user information may be continuously or periodically updated (information and messages may be added and/or deleted) based on a learning process implemented by intelligent code based on Internet usage patterns or the like. Such user information can be employed to tailor the selected waiting time messages to the user's likely interests, thereby enhancing user engagement and enjoyment as well as improving advertisement response rates.

The user information may be obtained at least in part from a data store including a repository of user information such as a registration site or other user information site or a user information database maintained on the user node. In one implementation, the user information is obtained by accessing a registration information processing system for the World Wide Web that substantially automates the user registration process at websites. The registration system includes a World Wide Web registration website wherein a user accessing the World Wide Web can utilize this website as a repository for registration information so that the user can request this registration information to be transmitted substantially automatically to another website to which the user desires to register. The registration information processing system has a first embodiment using a first system architecture wherein a user need not have any modules specific to the present invention loaded on his/her World Wide Web client node. In this embodiment, once the user has provided registration information to the registration website, when the user subsequently requests to register at a new website cooperating with the registration process, then the user provides this new website with a user ID and optionally password for the registration website together with an indication that any further information may be obtained from the registration website. The new website subsequently is able to automatically retrieve the user's registration information from the registration website and register the user at the new website. In the context of the present invention logic, resident on the user's node or at a separate website, associated with selecting and downloading messages for playback during Internet session waiting time or otherwise during an Internet session or other network use, can access the registration site to obtain user information for specifically directing messages of interest to the user based on the user information.

In a second embodiment of the registration information processing system having second architecture, World Wide Web client nodes have registration modules loaded on them so that these nodes may interact with the registration website for providing user registration information to cooperating websites to which the user requests to register. In this second embodiment, the user's registration information is stored both locally on the user's client node and at the registration website, the website being used as a backup. Thus, when the user desires to register at a new website or, in the context of the present invention, when logic associated with selecting and/or downloading messages is used to access user information on the registration site, the user's registration information is provided from the registration module residing on the user's client node.

In another implementation, user information is obtained from a database used to store user information for dissemination to websites for purposes other than site registration. Such user information may include any of various types of information that are provided or determined at least in part by the user. Examples include: user contact information such as a name, billing or residence address, URL, or phone number; financial information such as a credit card number or bank account number; service or product information useful in shopping for or purchasing airline tickets, hotel rooms, books, music, clothing, etc.; personal interest information for identifying commercial or informational websites of likely interest to the user; personal records such as medical records and investment information (e.g., purchases, when purchased, prices, ticker symbols, numbers of shares, etc.) that may be transmitted to relevant web sties from time-to-time; and other demographic or personal information. This implementation can use architectures as described above involving storage of the information at the user node and/or another node (a dedicated repository site or any other site where the information or a portion thereof has been transmitted) and may involve user identifiers and passwords as described above. The corresponding system involves: establishing a data store for storing user information including information determined at least in part by the user that the user desires to selectively disseminate to other nodes of the network; establishing rules regarding dissemination of the user information from the data store whereby the user information is disseminated based on a release thereof by the user; receiving a request to transmit at least a portion of the stored user information to a target website; making a transmission determination relative to said request based on the established rules; and selectively transmitting the user information portion to the target website depending on the transmission determination. The rules may specify, for example, that the user information may only be released in response to a user password or other code of user, thereby allowing the user to regulate access to the user information. In the context of the present invention, the user information can be accessed by logic(resident on the user node, a dedicated user information site or another site) for selecting and downloading messages so as to better direct such messages based on knowledge of the user. It will be appreciated that the use of such user information to direct messages is not limited to conventional Internet sessions, but may also be employed in the context of cable television, WebTV and other contexts involving user-addressable content.

According to yet another aspect of the present invention, waiting time messages are selected, at least in part, on the basis of the anticipated duration of the waiting time. It will be appreciated that the length of the waiting time will vary depending upon, inter alia, the speed of the website server, the amount of information to be loaded, the congestion of the Internet and the associated configuration of the path from the website to the user node, the nature and bandwidth of the legs of the communication path between the server and the user node, the communications network selected, the speed of the user node processor, and the operating parameters of the browser or other services involved in server/user communications. Some or all of these factors may be taken into account in estimating waiting time. A waiting time message or messages are preferably selected based on anticipated waiting time to increase message effectiveness and user enjoyment. For example, a short message may be displayed or played where the waiting time is expected to be of short duration and a room or gallery of messages may be made available in the case of a longer waiting period.

The present invention thus provides advertising or other content of likely interest to the user in an unobtrusive manner. It is believed that such content will more readily engage and entertain users and, therefore, will be more effective. Moreover, such content will not interrupt or distract from Internet sessions, can be tailored to the user's interests, and may inure to the user's benefit and, therefore, should be more acceptable to users and Internet service providers.

BRIEF DESCRIPTION OF THE DRAWINGS

For a more complete understanding of the present invention and further advantages thereof, reference is now made to the following detailed description taken in conjunction with the drawings in which:

FIGS. 8A and 8B present a flowchart for the steps performed when a user of the World Wide Web accesses a third party website 116, cooperating with the present invention, and in the process of registering at the third party website the user is automatically put in contact with the registrar website 100 of the present invention so that registration information may be provided to the present invention for registering the user at the present third party website as well as other third party websites that the user may subsequently request;

FIG. 9 is a flowchart of the steps performed by the present invention when transferring user registration information from the registrar website 100 to a third party website 116 to which the user has requested to register;

FIGS. 10A and 10B provide a flowchart of the steps performed when supplying third party website 116 with registration information from the registrar website 100, assuming that the third party website has requested such information and that the request has been authenticated at the registrar website 100;

DETAILED DESCRIPTION

In the following description, the invention is set forth with respect to certain illustrative processes for providing selected waiting time messages in connection with Internet sessions. An exemplary communications network in which the present invention may be implemented is described first. Thereafter, illustrative processes of the present invention will be described in the context of the communications network. Finally, the operation and architecture of certain registration and other sites, that provide user information useful to direct messages to particular users, are described in detail.

It will be appreciated that specific examples are included in the following description for purposes of clarity, but various details can be changed within the scope of the present invention. For example, although the invention is described in connection with an Internet application, various aspects of the invention are more broadly applicable to other types of user addressable networks, i.e., networks where messages can be specifically addressed to particular network users. In this regard, some cable television networks have such functionality to permit, for example, selective pay-per-view programming distribution. Moreover, with the advent of WebTV and other technology, the distinctions between voice, video and data networks are becoming blurred. In addition, certain aspects of the invention such as targeting messages based on user information are not limited to Internet waiting time, but may be used to target conventional Internet or television advertising, programming or other content.

Figure 1:
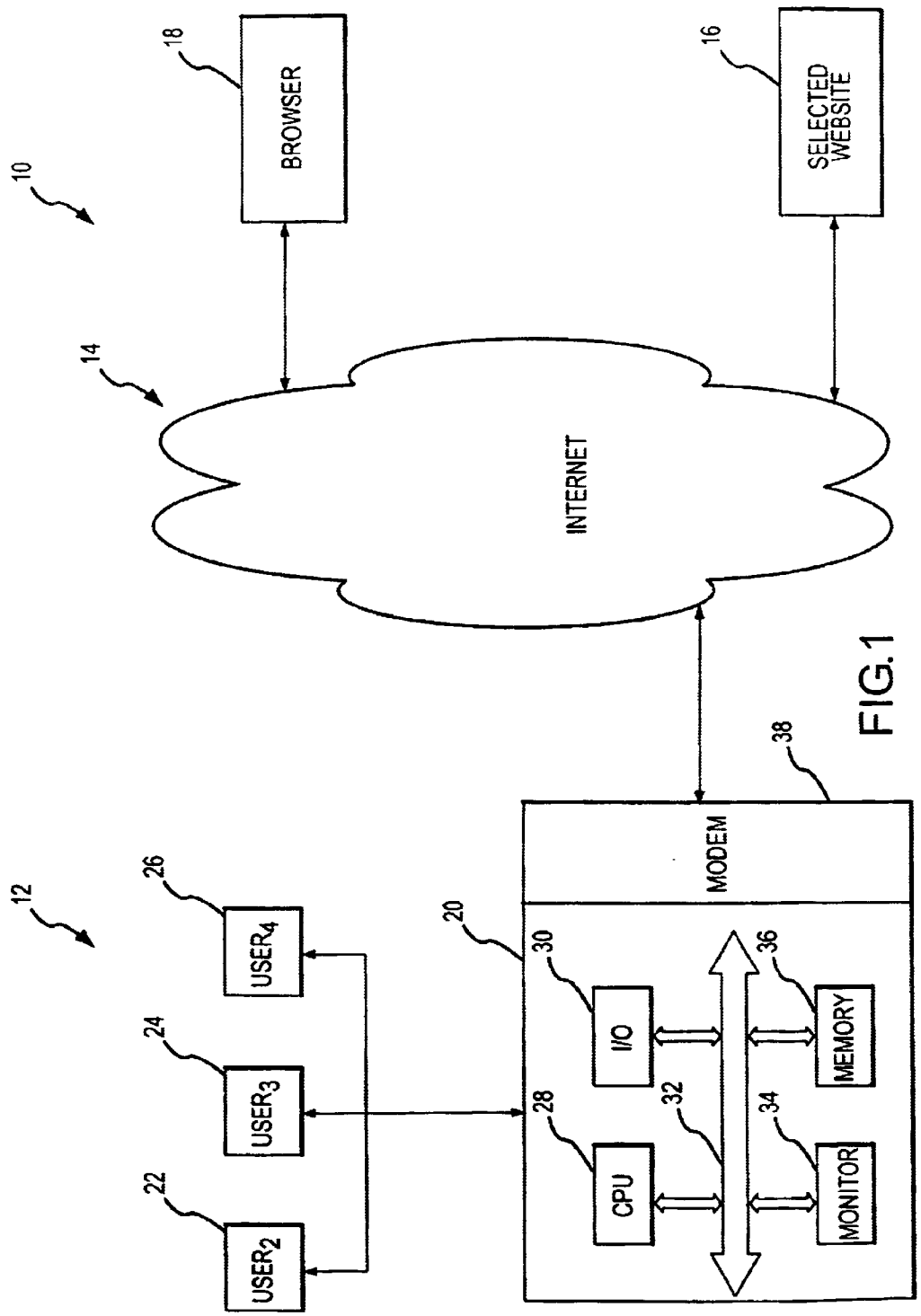
FIG. 1 is a schematic diagram of a communications network in accordance with the present invention.

Referring to FIG. 1, a communications network in which the present invention may be implemented is generally identified by the reference numeral 10. The network 10 includes a user node 12, a selected website 16, and a browser 18 that communicate via the Internet 14. The selected website 16 may be any website associated with the Internet 14. The browser website 18, may be the site of any suitable browser service such as Netscape Navigator by Netscape Communications, Inc., Internet Explorer by Microsoft Corporation or the like. As will be appreciated, the browser service associated with browser site 18 may be used to directly access selected website 16, e.g., by entering the website's URL, or a search engine may be used to identify and access the selected website 16, e.g., ALTAVISTA, YAHOO, LYCOS, INFOSEEK, EXCITE, etc.

As is well known, the Internet 14 is composed of a variety of network components including packet switched network systems, high speed dedicated lines, 56/64 kbps lines, etc. The user node 12 is connected to the browser website 18 and the selected website 16 via a virtual circuit within the Internet 14. That is, the Internet 14 may include a preferred route for making such connections, but such routes can be dynamically reconfigured depending on operating conditions such as Internet traffic and the bandwidth of particular legs of the route. Such reconfiguring may be initiated, for example, if waiting queues associated with particular packet switched network systems are full.

The user node 12 may be a single computer, a local area network or other arrangement of computers that communicate without accessing the Internet. In the illustrated embodiment, the user node 12 includes, for purposes of illustration, four users 20–26. For the present purposes only user one 20 is illustrated in detail. As shown, user one 20 is a computer system including input/output ("I/O") components 30, a central processing unit ("CPU") 28, a monitor 34, and computer memory 36 interconnected by way of data bus 32. The I/O components 30 may include, for example, a mouse, keyboard and/or similar user interface devices. User one 20 is further shown as including a nodem 38 for allowing communication across the communications network 10. It will thus be appreciated that user node 12 constitutes an Internet access site.

Figure 2:
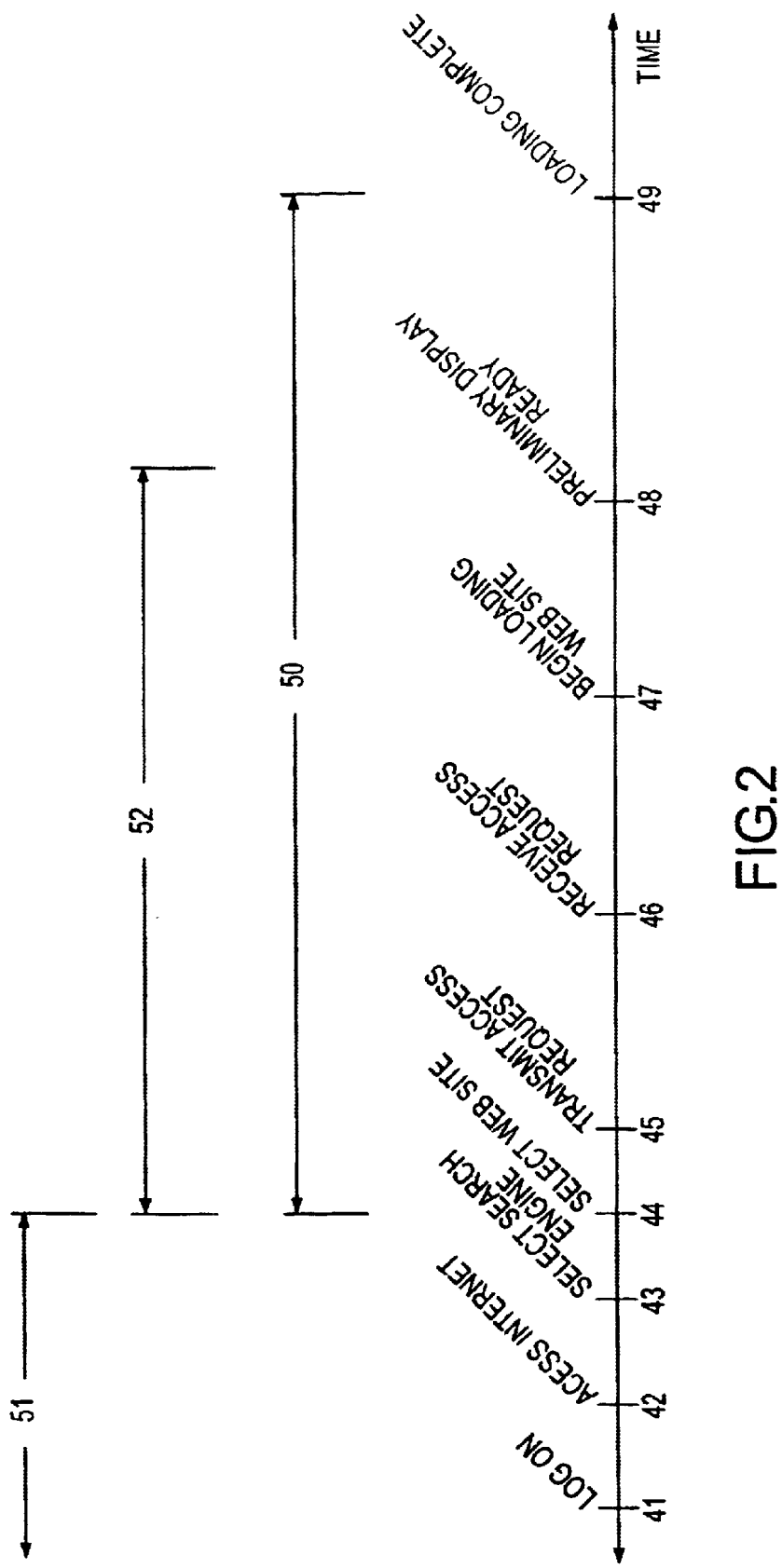
FIG. 2 is a time line illustrating a typical Internet session.

Referring to FIG. 2, a time line for a typical Internet session is shown. It will be appreciated that certain events shown on the time line may be omitted or reordered and the time intervals between events may vary. The illustrated session is initiated by the user by logging on (41) to a computer at the user node. After logging on to the computer, the user accesses (42) the Internet, for example, by using a mouse to click on a browser hot link icon. In response to such selection of the browser icon, the user node contacts the browser website server and the browser software is activated, and an Internet session is initiated. The user may then use the browser to select (43) a search engine to locate a website or information located on a website. Once a website of interest is identified, the user selects (44) the website, e.g., using the mouse to activate hot link icon of the website. A resulting access request is transmitted (45) from the browser to the selected website. It will be appreciated that the communications between the browser and website are conventionally conducted in accordance with standard communications protocols such as TCP/IP, HTTP or the like. Such protocols may define the format, sequencing, functionality and other aspects of the messages between the browser and the selected website to establish communication and effect loading of website information on the user node. In accordance with such protocol, the access request is received (46) by the server of the selected website and loading of website information begins (47).

At some point after loading of the website information has begun, the desired website page will be ready for display on the user node monitor. The timing of such display is determined by algorithms implemented by browser logic that determines the order of events relative to the loading process and by the nature of the website's architecture. As will be appreciated, the desired website page may be completely downloaded prior to display or portions of the desired page may be preliminarily displayed while loading continues. The time period (50) between website selection (44) and completion of website loading (49) may range from a few seconds to several minutes depending on a number of factors as discussed in more detail below.

The illustrated implementation of the present invention involves initiating the displaying or playing of messages during the waiting period between site selection and website page display. It will be appreciated that such messages may continue after page display has begun or been completed. The messages as well as the logic or program for operating the messages may be downloaded via the Internet or provided on a storage medium to the user. In the case of downloading, the messages and logic may be provided by a browser, search engine or other service provider on its website. The preferred implementation of the present invention involves downloading a collection or set of messages to the user node and selecting particular messages from this set to be displayed during a waiting time associated with loading of the website. As shown in FIG. 2, the preferred time period (51) for downloading the message set occurs prior to website selection (44). In this manner, user node resources remain fully available for use in loading the selected website information. The message set may be downloaded during the Internet session or may be stored during one Internet session for use in a subsequent Internet session. Indeed, the message set, or at least a base message set, may be loaded long before a given Internet session. The base set may be continuously or periodically updated (messages may be added and/or deleted) by intelligent code based on Internet usage patterns or other acquired user information. Alternatively, the message set may be loaded onto the user site other than by downloading from the Internet, e.g., from a disk or other storage unit. Alternatively, especially in cases where the messages are not limited to presentation during Internet waiting time, the messages may be selected at a separate site and transmitted to the user node for substantially real-time presentation.

The preferred message display or playback period (52) occurs during the waiting time between website selection (44) and the initiation of website page display (48). Conventionally, during this waiting time period, the user node monitor is inactive except for certain cues to indicate that loading is in progress and, perhaps, indicating the status of the loading process (e.g., indicating the percentage of loading that is complete and the size of the file or other data unit being downloaded). It will therefore be appreciated that the time period utilized to display messages according to the preferred implementation of the present invention is time that would otherwise be essentially wasted from the ordinary user's perspective. For this reason, it is anticipated that users will be receptive to viewing messages at this time. Such messages may include advertising and promotional messages, product information, public service messages or various other messages.

Figure 3:
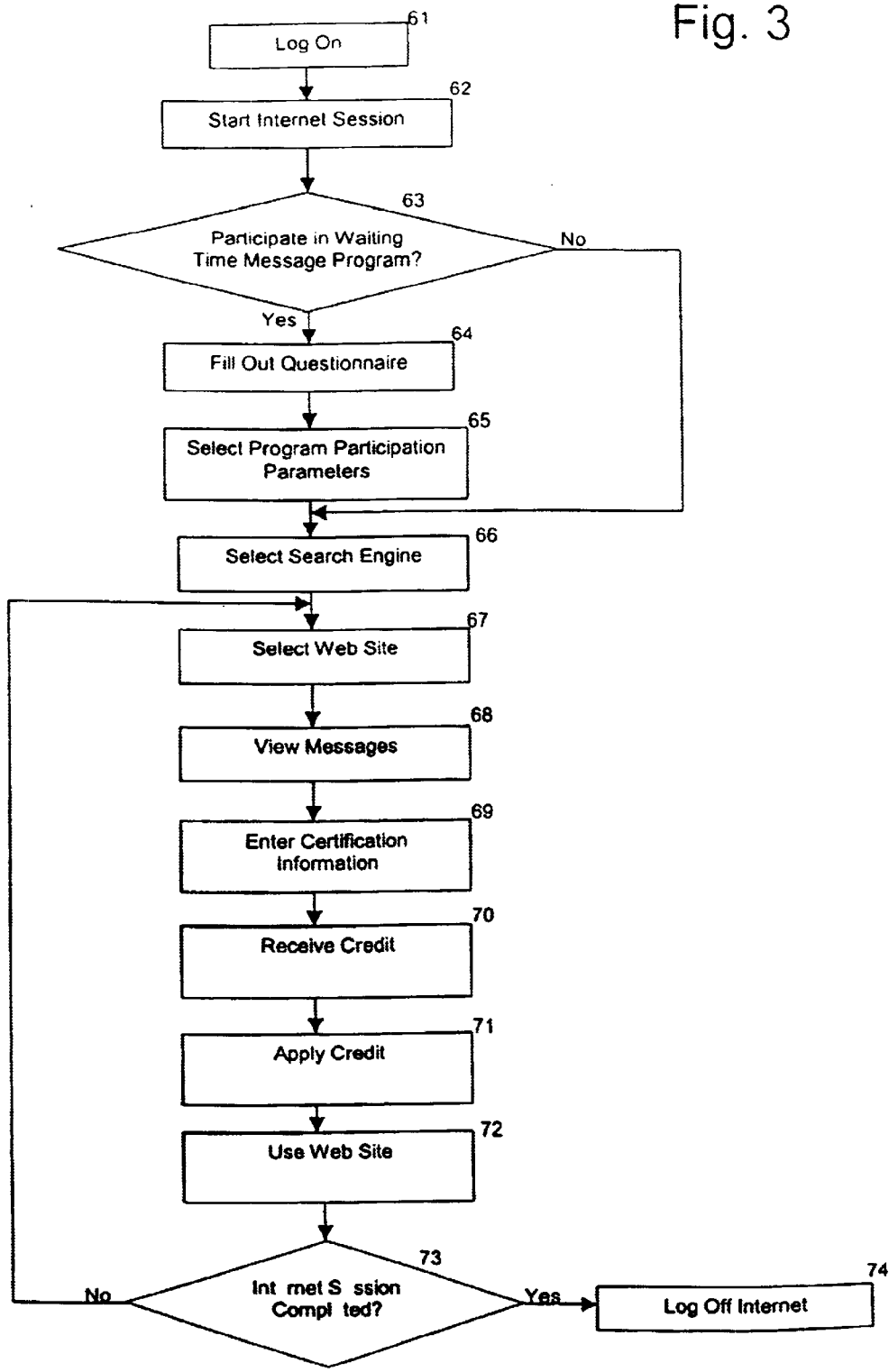
FIG. 3 is a flow chart illustrating a process implemented by a Internet user in accordance with the present invention.

FIG. 3 illustrates a user implemented process in accordance with the present invention. The process in initiated by logging on (61) at the user node and starting (62) an Internet session as described above. In the illustrated process, the user is allowed to elect (63) whether to participate in the waiting time message program of the present invention. The user may elect to participate in the program, for example, by responding to an appropriate prompt provided in connection with the browser, search engine or other Internet service. For example, such a prompt may be available on a home page of the server site associated with such a service. If the user elects to participate in the program, the user may further agree to provide user information that can be used to tailor the user message set to the user's interests. For example, the message set may be selected based on demographic, psychographic or product interest preferences of the user. Such information may be obtained from a website or other database where such information is stored for the user as described in detail below. Alternatively, such information may be obtained by way of filling out (64) a questionnaire provided in conjunction with the waiting time message program. For example, the questionnaire may elicit information regarding the user's age, product preference, lifestyle, income and the like. Additionally, the illustrated waiting time message program allows the user to select (65) program participation parameters. In this regard, for example, the user may wish to indicate a different message preference matrix (e.g., travel and leisure, public service or product information) for different Internet sessions. Similarly, the user may set a specific loading state where waiting time messages are to be terminated, e.g., 25%, 50%, 75% or 100% complete.

After the user has completed entry of such user information, the user may proceed to select (66) a search engine, and select (67) a website of interest. While the user waits for the selected website to be loaded, the waiting time message program selects messages in accordance with the user information (if applicable) and the selected messages are viewed (68) by the user. The program may also provide messages as a screen saver function during periods of inactivity or may be used to provide conventional advertisements (e.g. banner ads) selected based on user information.

Especially in cases where the waiting time message program is offered in conjunction with browser, search engine or other Internet services, the service provider may provide an incentive program to encourage participation in the waiting time message program. For example, a frequent use program may be offered to encourage and reward participation by providing credits towards free Internet access or other value based on the number or duration of messages viewed. In order to track such usage, the user may be required to enter (69) certification information in conjunction with viewing messages. Such certification information may be entered, for example, by responding to appropriate prompts provided during or after messages. Alternatively, such credits may be awarded automatically. The user then receives (70) credit for viewing the messages which may be applied (71) towards the incentive program. For example, the credit may be applied towards paying subscription fees or collected for application towards other items offered as part of the incentive program. It will thus be appreciated that use is monitored by an authentication system at a central site such as the site of an Internet service provider. The authentication system employs a usage credit counter to monitor usage. In addition to tracking usage for the incentive program, the records accumulated by the authentication system will assist advertisers in tracking advertisement usage. Once the selected website is loaded and the waiting time messages are terminated, the user may use (72) the selected website in conventional fashion. Upon completing use of the selected website, if the Internet session is completed (73), the user logs off (74) the Internet. Otherwise, the user selects (67) a further website page and the process is repeated. If the user moves to a page that is stored in cache (e.g., by using forward or back function), display will be essentially instantaneous and the message program will not be implicated. However, if the new site request requires Internet access and a delay is involved, messages will be provided.

Figure 4:
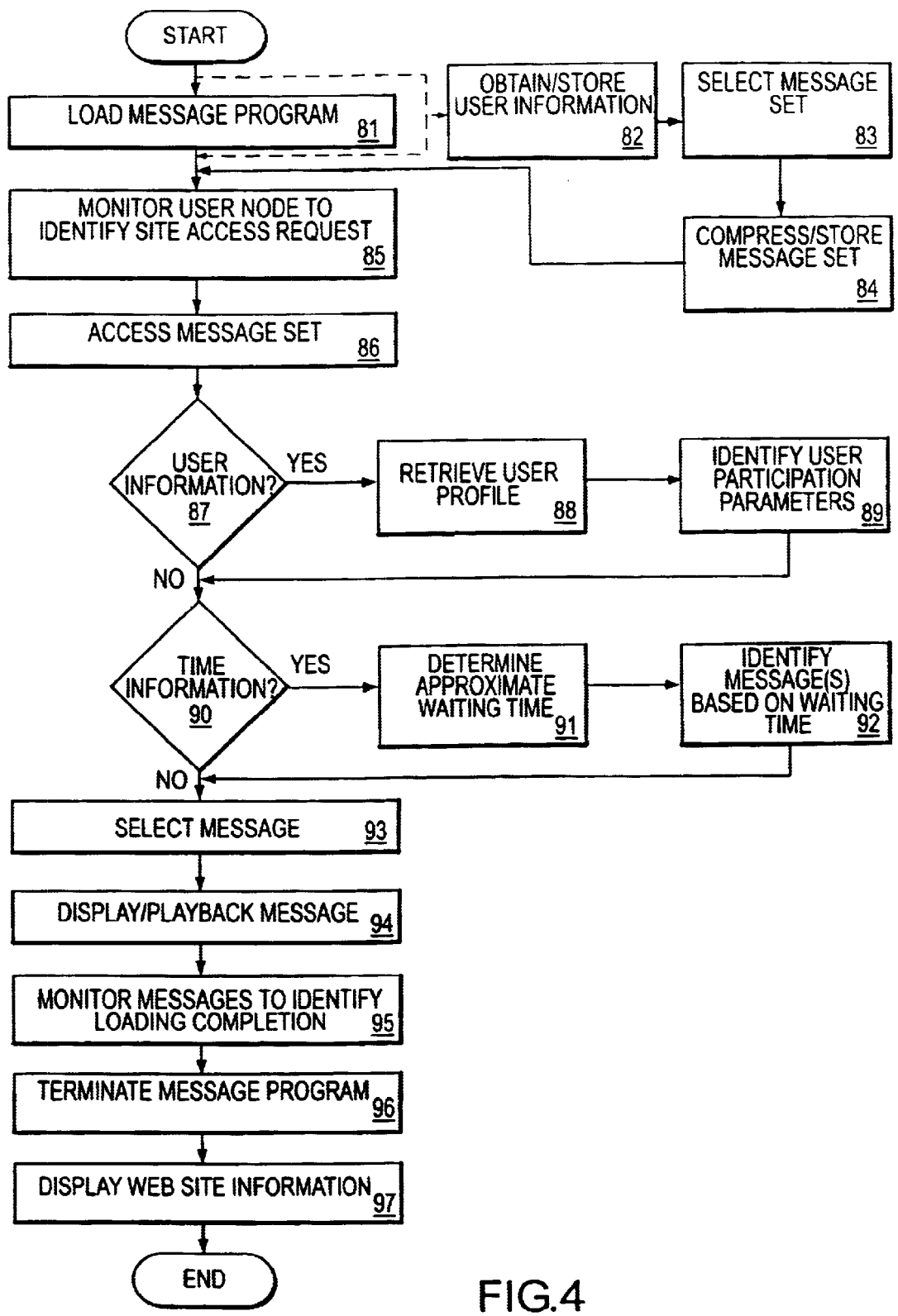
FIG. 4 is a flow chart illustrating a process implemented by a waiting time message program in accordance with the present invention.

FIG. 4 is a flow chart illustrating operation of the waiting time message program. The program may be executed, for example, on the CPU of the user node and may be loaded (81) at log on or at the start of Internet session. As indicated in FIG. 4, user information may be obtained and stored (83) prior to or after loading of the program. As previously noted, the user information may be obtained from a separate website or may be obtained by way of a questionnaire implemented by the program. The user information is preferably stored in computer memory at the user node (on the user's computer, on another computer in the user's local area network, or otherwise stored for retrieval without accessing the Internet). Based on the user information, the program selects (82) a message set by employing algorithms for deriving demographic, psychographic, lifestyle or other information based on the user information and retrieves a corresponding message set. The message set is then compressed (84) for compact storage at the user node.

During an Internet session, the program monitors (85) the user node to identify a site access request. The site access request may be identified by reference to a header message of a protocol communication between the browser and the selected website. Alternatively, the site access request may be identified by monitoring operating system messages or by identifying a URL entry via a keyboard. Upon identifying a site access request, the program accesses (86) the message set stored, for example, on the user's hard drive or in cache. The program may select (93) a message from the message set based on user information, information regarding the expected duration of the waiting time, both, or neither. If user information is to be utilized (87) the program retrieves (88) a user profile. The user profile is preferably based on user information voluntarily entered by the user as described above. Alternatively, user information may be derived, for example, based on the selected website, a history of selected websites during the current Internet session and/or previous sessions or based on other information obtained by monitoring the user node. In addition, the program may identify (89) user participation parameters entered by the user as described above.

If time information is to be utilized (90) the program determines (91) the approximate waiting time associated with a particular website access request. The approximate waiting time depends on a number of factors including the speed of the server at the selected website, the level of congestion on the Internet and any rerouting required by such congestion, the bandwidth of each leg of the route between the selected website and the user node, the processing speed of the user node, the operation of the browser, and the size and number of files that are downloaded before display can begin. Ideally, as many of these factors as possible should be taken into account in determining the approximate waiting time. For example, the headers of protocol communications between the browser and the selected website convey information regarding the quantity of information that is to be downloaded. Such data is commonly used to provide displays during loading such as "15% of 7K" or the like. This information can used to gain some information regarding the approximate waiting time, although it will be appreciated that actual waiting time may be longer than expected as multiple files may be linked by tags, i.e., a message embedded in one file may direct the browser to access another file at the selected website. The program can use such file size information together with information regarding the speed of the user node processor, the operation of the browser and empirical data gained through experience to approximate the waiting time and identify (92) messages to be displayed or played during the waiting time. Additionally, information regarding the expected waiting time and regarding the fastest communication network at the current time may be obtained by "pinging" one or more communications networks, e.g., issuing network access requests to the network(s) and measuring the response time for receiving a responsive signal.

The corresponding messages are then selected (93) by the program and displayed or played back (94). During the waiting time, the program monitors (95) messages to identify an indication that loading is complete or has reached a level selected by the user as a participation parameter. Such an indication may be provided, for example, by way of a message from the browser to the operating system to initiate the display or by monitoring the loading status. Upon identifying such a message, the program terminates (96) the waiting time messages and the user node proceeds to display (97) the website information as usual. In this manner, the messages are provided only during the waiting time and do not delay or interfere with the user's Internet session.

In order to select waiting time messages of likely interest to the user, the waiting time message system may access sites including user information or otherwise obtain such user information and select messages based on the information. Examples of such sites include registration sites and other user information sites. Specific implementations of such sites are described in connection with FIGS. 5–18 below.

Figure 5:
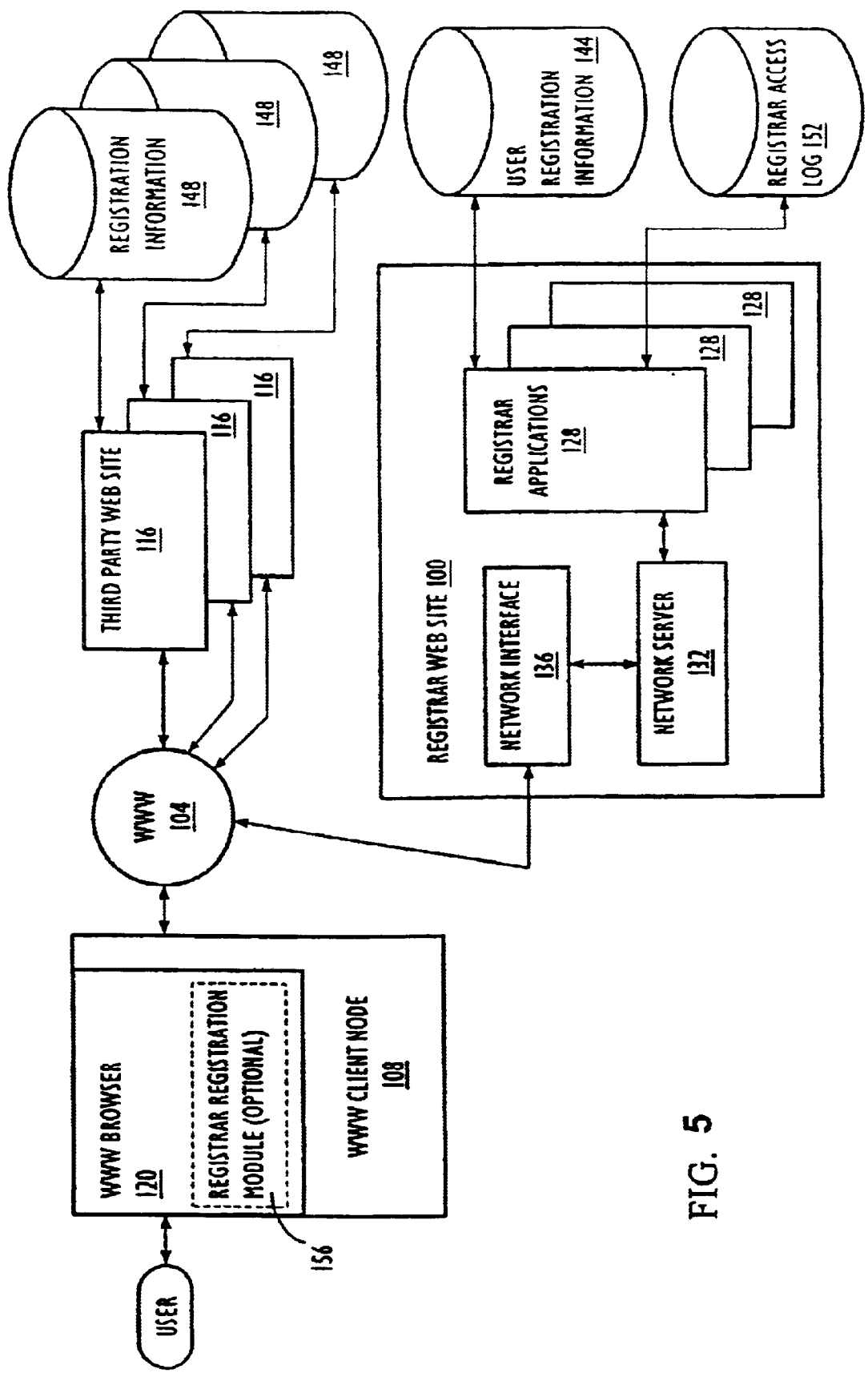
FIG. 5 is a block diagram of the website registration information processing system of the present invention, wherein this system is shown in the context of its connections to various nodes of the World Wide Web.

FIG. 5 is a block diagram of a website registration information processing system (hereinafter also denoted by the name "registrar") wherein this system is shown in the context of its connections to various nodes of the World Wide Web (WWW). In a first embodiment, a website, denoted the registrar website 100 is connected to the World Wide Web 104 for communicating with both World Wide Web client nodes such as WWW client node 108, and with other websites such as third party website 116, wherein the registrar website 100 facilitates the registration of a user at a WWW client node 108 when this user desires to register at the third party website 116. In this first embodiment, the user accesses the World Wide Web 104 through a WWW browser 120 on a WWW client node 108 wherein, to use the registration facilities of the registrar website 100 for registering the user at one or more third party websites 116, the user must in some manner request explicit access to the registrar website 100 for registering his/her registration information to the registrar website 100. Additionally, in this embodiment, the WWW client node 108 need not have executable program modules designed specifically for interfacing with the registrar website 100. That is, substantially any conventional World Wide Web browser may be used as the WWW browser 120.

Thus, the first embodiment may be described as follows. In order for a user to register at one or more third party websites 116, the user at a WWW client node 108 accesses the World Wide Web 104 and in a first scenario explicitly navigates through the World Wide Web 104 to the registrar website 100 wherein a registrar website 100 home page is communicated back to the user's WWW browser 120. As one skilled in the art will appreciate, program modules 128 (hereinafter denoted "registrar applications") output, to a World Wide Web network server 132, information in, for example, a hypertext markup language (HTML) related to capabilities of the registrar website 100 in assisting the user in registering at third party websites 116. Such outputs from registrar applications 128, are subsequently transmitted, via the network server 132 and the network interface 136, to the user's WWW browser 120 in the hypertext transfer protocol (HTTP), as one skilled in the art will appreciate. Thus, upon presentation of the registrar website 100 home page on the user's WWW client node 108, the user subsequently may request to provide registration information to the registrar website 100 so that he/she can have this information at the registrar website 100 automatically transferred to a third party website 116 when the user is requested to register at such a third party website. Subsequently, after the user's request to supply registration information is transmitted to the registrar website 100 (via World Wide Web 104, network interface 136 and network server 132), the registrar applications 128 receive the request and output to the user's WWW browser 120 one or more "web pages" having fillout forms to be presented to the user via the WWW browser 120. Thus, upon submittal of the filled out forms by the user to the registrar website 100 (more precisely, the registrar applications 128), the user's registration information is stored in the user registration information database 144.

Following the above registration procedure at the registrar website 100, the user may then substantially automatically register at, or otherwise transfer user information to, various third party websites 116 that are affiliated with the registrar website 100 in that an agreement has been reached between each such third party website 116 and the registrar website 120 for transmitting a user's registration information or some portion thereof to the third party website 116 when, for example, the user requests such transmittal. Thus, assuming the user accesses the third party website 116 and, for example, the home page for the third party website 116 includes a form field allowing the user to specify that the user's registration information is stored and accessible at the registrar website 100, then the user can submit a response, via the World Wide Web 104, to the third party website 116 indicating that the user's registration information should be obtained from the registrar website 100. Similarly, logic (resident on the user node or another node) for use in targeting messages based on user information may obtain such user information from the registrar site. Based on this user information or a portion thereof, a user profile may be developed that is useful for targeting messages to the user. Thus, the third party website 116 requests and receives the user's registration information from the registrar website 100 and stores the user's registration information in registration information database 148 directly accessible by the third party website 116. Additionally note that when the registrar website 100 receives a request from the third party website 116 for user registration information, a registrar application 128 records the request for the user's registration information in a registrar access log data base 152. Thus, the registrar website 100 maintains a log of the third party websites requesting registration information. Further, such third party websites 116 may periodically provide the registrar website 100 with information related to the frequency that users registered at the registrar website 100 have accessed the third party websites 116. Therefore, by also storing this information, for example, in the registrar access log 152, the registrar website 100 is able to determine the frequency and type of access of third party websites 116 by users.

In a second method of using the first embodiment, instead of the user explicitly navigating the World Wide Web 104 to the registrar website 100 for providing registration information, the user may instead access a third party website 116 wherein the home page or registration page for the third party website includes input fields allowing the user to request that the registrar website 100 automatically be accessed so that the user can enter website registration information at the registrar website 100 and subsequently use the registration information provided to the registrar website 100 for automatically registering at the third party website 116 (as well as other third party websites that may be subsequently requested). That is, the newly entered registration information is transferred to the third party website 116 by entering into a registrar specific portion of the registration form for the third party website 116 a registrar user identification and optionally a password for requesting that the third party website access the registrar website 100 to obtain the user's registration information. Thus, the user's registration information automatically is communicated to the third party website 116 without the user explicitly having to navigate the World Wide Web 104 and access the registrar website 100 to register his/her website registration information. In the context of targeted messages, a third party site or network operator associated with selecting messages may access the registrar website 100 to select messages for downloading or otherwise transmitting for substantially real-time presentation at the user node Note that alternative embodiments are within the scope of the present invention, wherein program modules for the present invention are distributed so that there is an executable module provided on the user's WWW client node 108 for communication with the registrar website 100 as well as with third party websites 116 that accept registration information. In one embodiment of such a distributed architecture registration module 156 is integrated into the user's WWW browser 120 for gathering the user's website registration information and communicating with the registrar website 100 as well as cooperating third party websites 116 at which the user desires to register. Such a registration module 156 may provide the user with easier access to his/her registration information since the information resides locally on the user's WWW client node 108 in a persistent nonvolatile storage. Further, the registrar registration module 156 may be activated for entering or updating user registration information without the user necessarily being connected to the World Wide Web 104. Moreover, by integrating the registrar registration module 156 into the user's WWW browser 120, the user is presented with an integrated set of functions for registering and accessing third party websites 116.

Thus, in such distributed architectures, after the user has entered registration information into the registrar registration module 156, this module will substantially automatically contact the registrar website 100 (via the World Wide Web 104) and thereby communicate the user's registration information to the registrar website 100 so that, for example, the user's registration information may be reliably stored in case there are failures at the user's WWW client node 108. Thus, to access a third party website 116 that cooperates with the registrar for registering the user, once the user has made contact through the World Wide Web 104 with such a third party website 116, the user transfers his/her registration information from the registration module 156 to the third party website. Further note that in the registration process of the present embodiment, whenever the user registers at a third party website 116, the registrar website 100 is provided, by (for example) the module 156, with information related to the registration so that the user also has a off-site backup copy of all registrations at third party websites residing at the registrar website 100.

Note that other distributed architectures for the present invention are also contemplated wherein the registrar registration module 156 on the user's WWW client node 108 is not integrated with the user's WWW browser 120. In such an embodiment, the user may be faced with a different user interaction technique for the module 156 than that of the WWW browser 120. However, the user is provided with added flexibility in choosing a WWW browser 120 and/or using his/her existing browser 120 which may not contain as part of the browser the registrar registration module 156.

Figure 6A:
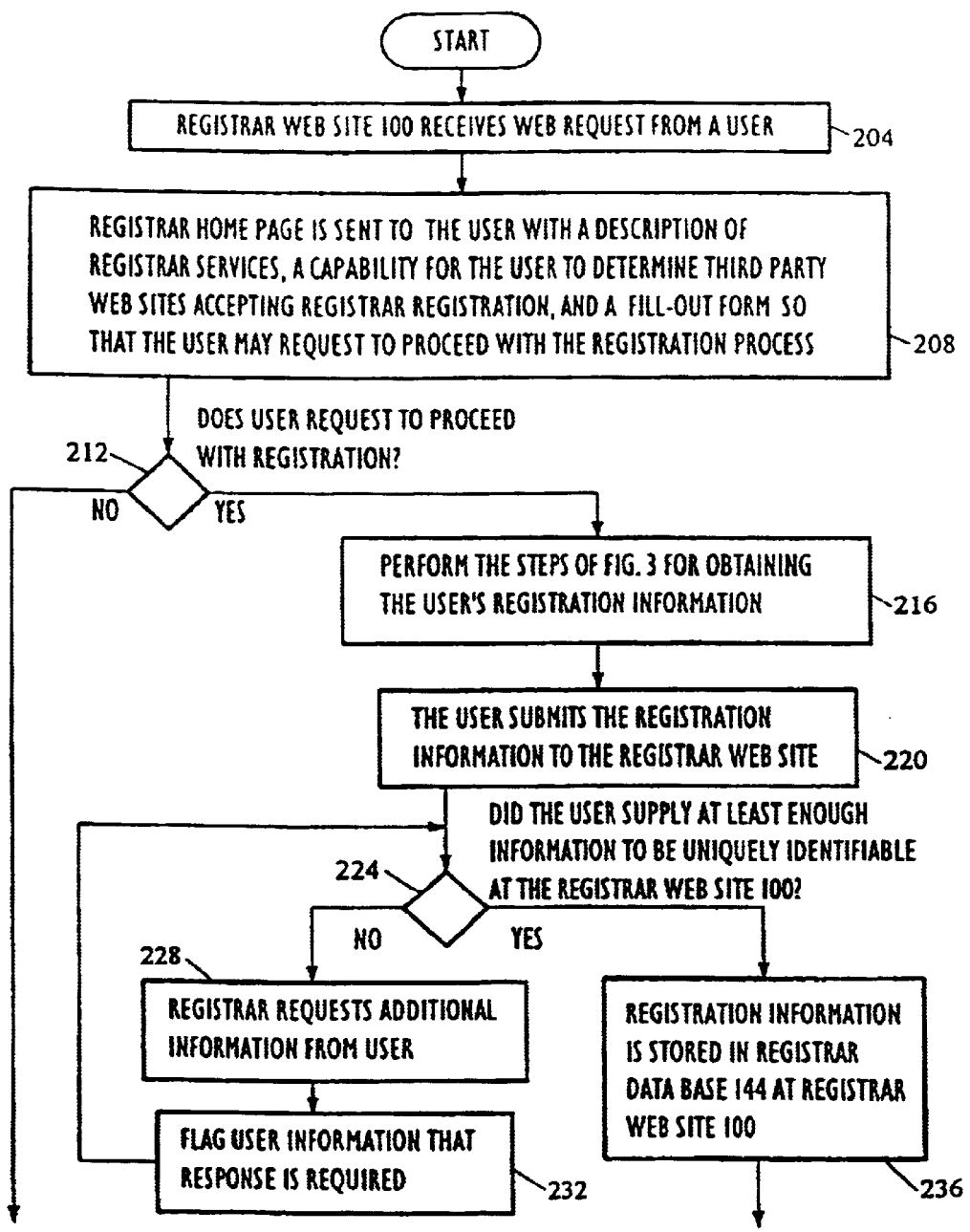
FIGS. 6A and 6B provide a flowchart for describing the steps performed when a user of the World Wide Web explicitly contacts the registrar website 100 of the present invention for supplying registration information to be used in registering at third party websites 116.
Figure 6B:
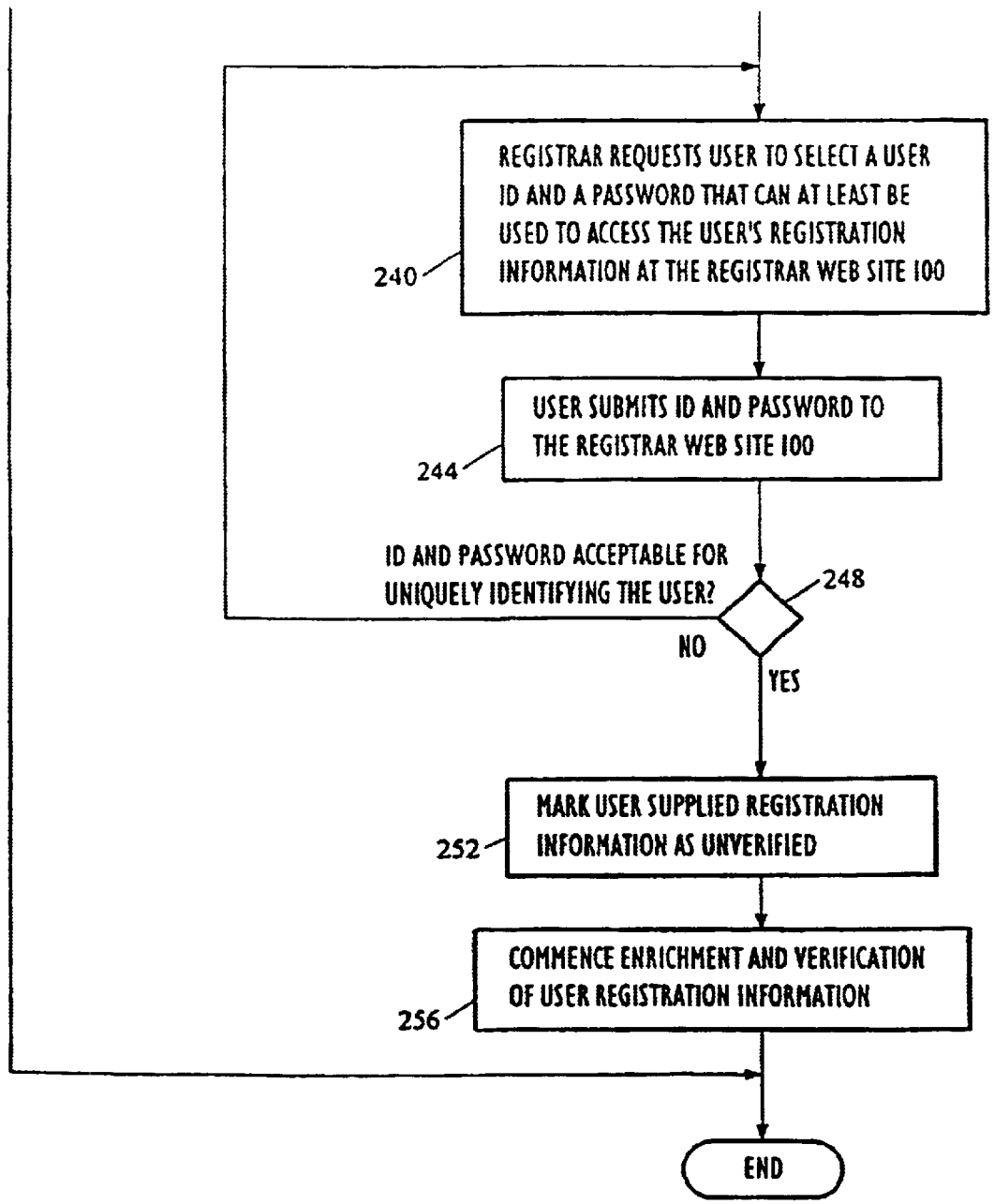

In FIGS. 6A and 6B, a flowchart is presented describing the steps performed when the user explicitly navigates the World Wide Web 104 to contact the registrar website 100 for supplying registration information. Accordingly, assuming the user contacts the registrar website 100, in step 204 the website 100 receives the user's request for information. Subsequently, in step 208 the registrar website 100 responds with a home page describing the registrar services, a selection or browsing capability for reviewing third party websites 116 accepting registrar registrations, and a fill-out form so that the user may request to proceed, if desired, with entering registration information at the registrar website 100. In step 212 the user determines whether to proceed with the registration process or not. Assuming the user elects to proceed, the request to proceed is transferred back to the registrar website 100 wherein a registrar application 128 examines the response and outputs a fill-out form that is transmitted back to the user's WWW browser 120 so that the user may enter his/her registration information and submit it to the registrar website 100. Thus, in step 216 the steps of the flowchart of FIG. 3 are performed by the user when entering information into the registration fill-out form provided by the registrar website 100. Subsequently, in step 220 the user initiates the transfer of his/her registration information to the registrar website 100. Note that the submittal of the registration information may be performed by a conventional electronic transfer through the World Wide Web 104 using any one of various Internet protocols or, alternatively, other techniques for transferring the information to the registrar website 100 are also contemplated. For example, the user may fax a printed copy of a completed registration form to the registrar website 100 at which point the information may be manually input into the user registration information database 144. In step 224, upon receiving the user's registration information, one or more registrar applications 128 review the user's registration information for determining whether there is enough information supplied to at least uniquely identify the user. If not, then in steps 228 and 232 a registrar application(s) 128 requests additional information from the user and flags the user's information currently stored in the user registration information database 144 indicating that a user response is required to further process the user's information. As an aside, note that other feedback loops to the user are contemplated that are related to the loop of steps 224 through 232. For example, it may be the case that the user has supplied sufficient information to be uniquely identifiable at the registrar website 100, but the user has supplied insufficient information for the registrar website 100 to supply adequate information to most third party websites 116 that utilize registrar registration capabilities. Thus, a similar feedback loop to loop 224 through 232 may be provided for requesting that the user supply additional information so that a substantial number of third party websites 116 cooperative with registrar will allow the user to register at them using only the information supplied by the registrar website 100.

Referring again to step 224, if a determination is made that sufficient registration information has been received at the registrar website 100, the user's registration information is stored in the user registration information database 144 (step 236) and subsequently a registrar application 128 outputs a request to the user to select a user ID and password that can be at least used to access the user's registration information at the registrar website 100 (step 240). Assuming, as in step 244, that the user submits a user ID and a password to the registrar website 100, then in step 248 a determination is made by the present invention a registrar application 128 as to whether the user supplied ID and password is acceptable for uniquely identifying the user. If not, then steps 240 through 248 are repeated until an appropriate user ID and password are entered by the user. Thus, assuming that an acceptable user ID and password are provided, in step 252 the registration information supplied by the user is marked as unverified since there has been no independent confirmation that the user supplied information is accurate. Subsequently, in step 256 a registrar application 128 commences to enrich the user's supplied registration information with publicly available information related to the user and, to the degree possible (i.e., conforming with Internet etiquette, privacy concerns of users, and public policy), to verify the user's registration information. Note that by comparing the user supplied information with information about the user from other sources, a determination can be made as to the accuracy of the user supplied information. Thus, whenever an item of the user supplied information is independently verified, then that item is unmarked. Alternatively, if discrepancies arise between the user-supplied information and other publicly available information about the user, then the user may be alerted to these discrepancies and requested to confirm his/her initial responses.

Figure 7:
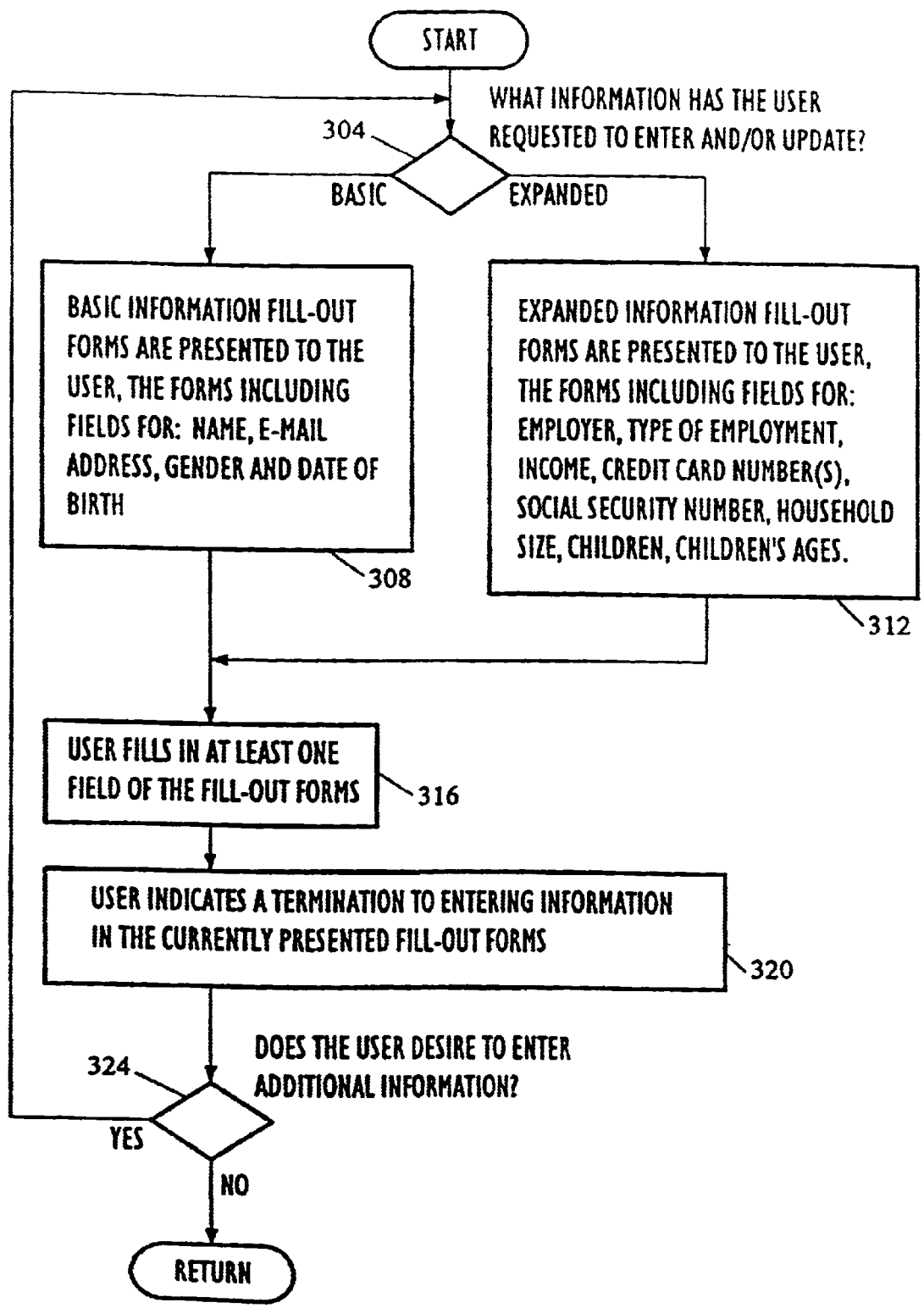
FIG. 7 is a flowchart presenting the steps a user of the World Wide Web performs when entering website registration information into fill-out forms that are to be submitted to the registrar website 100 of the present invention.

Referring now briefly to FIG. 7, this flowchart presents the steps a user performs when entering website registration information into the fill-out forms to be submitted to registrar. Accordingly, in step 304 the user determines whether to supply basic information (i.e., requested by a substantial number of third party websites 116) as described in step 308 or to supply expanded information (i.e., more extensive information about the user so that, for example, registrar has sufficient user information to register the user at substantially all cooperating third party websites 116). Note that at least in one embodiment, the basic information supplied in step 308 (i.e., the user's name, e-mail address, gender and date of birth) is also requested in the forms for expanded information in step 312. Thus, upon filling in at least one field from the fill-out forms (step 316) presented in either step 308 or 312 the present invention field checks the user's input for syntactically appropriate responses. Subsequently, in step 320, the user inputs a request to terminate entering information in the presently presented fill-out form(s) and in step 324 the user determines whether to enter additional information in either the basic registration information fill-out forms or the expanded information fill-out forms. If the user indicates that he/she desires to enter further registration information, then step 304 is again performed. Alternatively, the flowchart returns to the invoking program (flowchart) with the user supplied registration information.

Figure 8B:
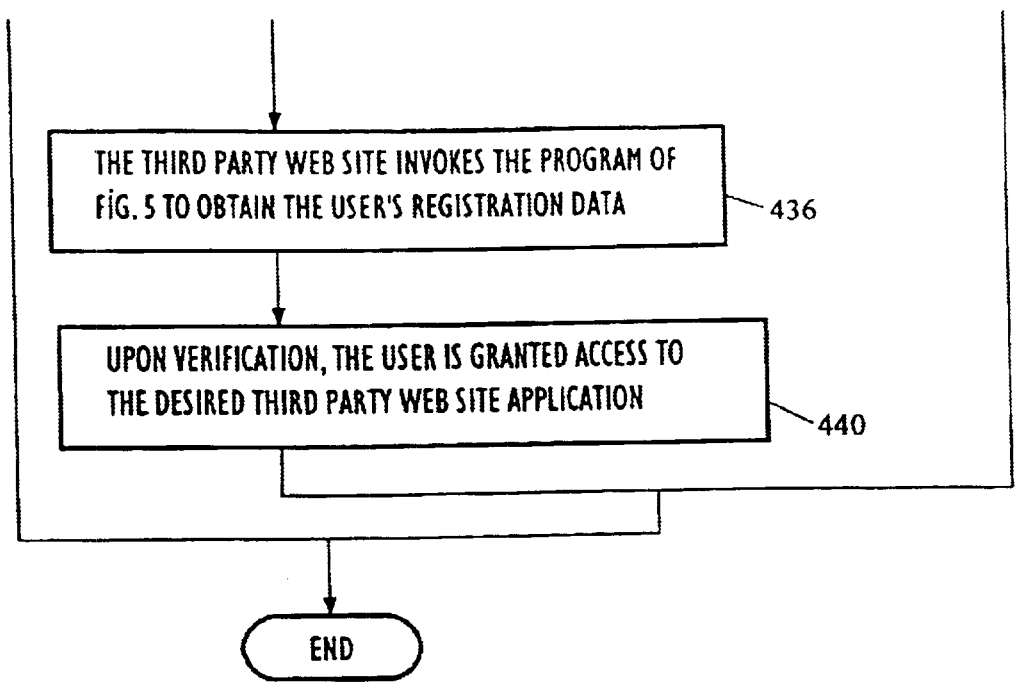

FIGS. 8A and 8B present a flowchart for the steps performed when the user accesses a present third party website 116 cooperating with registrar, and in the process of registering at the third party website the user is automatically put in contact with the registrar website 100 so that registration information may be provided to registrar for registering the user at the present third party website as well as other third party websites that the user may request. Accordingly, assuming the user uses a WWW browser 120 to access a third party website 116 as in step 404, the third party website responds with a website home page (step 408) typically having a registration fill-out form into which the user is requested to enter registration information. Note that the user may or may not be registered at this third party website. Thus, if the user is registered, then he/she may only need to enter a user ID and optionally a password in order to gain access to a desired application at the third party website. Further note that for different third party websites 116, the user's identification (and optionally a password) may be different due to constraints on user ID (and password) syntax being different at different third party websites. Further, such user IDs at different websites may be different because a user ID requested by the user may already have been assigned to another user.

Subsequently, once the third party website 116 has received a response from the user, a determination is made as to whether the user is registered at the website (step 412). If the user is registered, then no further pertinent processing is required. Alternatively, if the user is not registered at the third party website, then a response is transferred from the third party website 116 through the World Wide Web 104 to the user's WWW browser 120 providing the user with the fill-out forms in which the user is requested to enter information for registering at the third party website. Note that if the third party website 116 is configured to accept user registration information from the present invention, then at least one fill-out form related to registering at the third party website 116 will request information related to registering the user by using the present invention. In particular, the third party website 116 may present the user with a fill-out form requesting the user to enter a user ID and optionally a password for the present invention (i.e., registrar) if the user is registered at the registrar website 100. Additionally, the presented fill-out forms may request the user to indicate whether he/she prefers to register at the third party website 116 by using registrar. Thus, assuming the user desires to register at the third party website 116, a determination is made as to whether the user wishes to register using the registrar present invention or register at the third party website without using the present invention (step 416). If the user chooses to not use the registrar for registering at the third party website 116, then the user explicitly supplies registration information for the present third party website (step 420). Alternatively, if the user chooses to use registrar to register, then once the present third party website 116 receives a response from the user indicating the choice to use registrar to register, in step 424, the present third party website sends a request to the registrar website 100 for registering the user at the registrar website 100. Subsequently, in step 428 the steps of FIGS. 2A and 2B are performed for registering the user at the registrar website 100. Subsequently, after registering at the registrar website 100, in step 432, the user is automatically placed in contact with the present third party website so that he/she submits a registration fill-out form to this third party website 116: (a) indicating that the user's registration information may be obtained from the registrar website 100; and (b) providing a user ID (and optionally a password) for the registrar website 100 to be used as identification at the present third party website. Following this, in step 436 the third party website 116 invokes the program corresponding to FIG. 5 to obtain the user's registration data from the registrar website 100. Lastly, upon verification by the third party website 116 of the user's registration data, the user is granted access to the desired third party website and/or application (step 440).

In FIG. 9, a flowchart is presented of the registration data transmission process from the registrar website 100 to a third party website 116 or targeted message selection logic resident on the user node or elsewhere. Accordingly, in step 504 the third party website 116 provides the registrar website 100 with identification of the third party website, the user's registrar user ID and (any) registrar password. Further, in some instances, as will be described below, the third party website 116 also supplies the registrar website 100 with a return path to the user through the World Wide Web 104. Following this, in step 508, a determination is made by the registrar website 100 as to whether the third party website supplied information can be authenticated. If not all third party website information is authenticated, then step 512 is encountered wherein a determination is made as to whether to request that the third party website to resend the information of step 504. Note that such a determination may be made in one embodiment depending upon whether the third party website identification is authenticated. That is, if the third party website identification is authenticated, then a retry may be allowed. Otherwise, no retry may be allowed. Alternatively, referring again to step 508, if all information transmitted from the third party website 116 is authenticated at the registrar website 100, then step 516 is encountered. In this step, the program represented by FIG. 6 is performed for supplying the third party website 116 with registration information related to the user from the user registration information database 144.

Figure 10B:
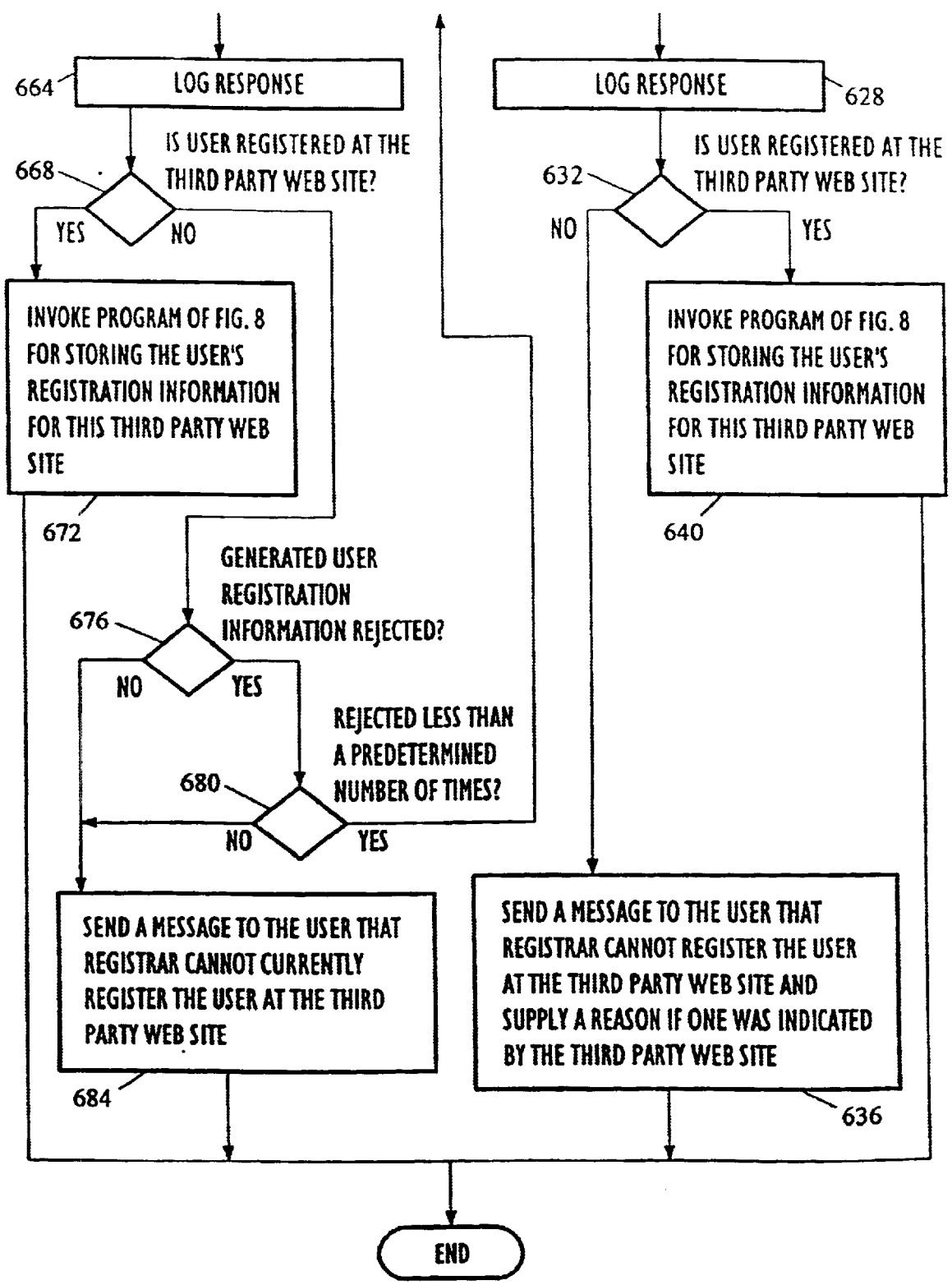

Referring now to FIGS. 10A and 10B, the flowchart presented here provides the steps for supplying a present third party website 116 with registration information from the registrar website 100, assuming that the present third party website 116 has requested such information and that the request has been authenticated at the registrar website 100. Accordingly, in step 604 the registrar website 100 or, more precisely, a registrar application 128 performs the steps of FIG. 11 for retrieving the user registration information requested by the present third party website 116 from the user registration information database 144. Note that a third party website 116 may request various categories of information from the registrar website 100 related to the user. In particular, a third party website may request: (a) basic information as discussed in step 308 of FIG. 7; (b) expanded information as discussed in step 312 of FIG. 7; (c) custom information, wherein selected fields from the basic and expanded information are provided; and (d) proprietary information wherein one or more additional user related information items may be provided wherein these items have been obtained by the registrar website 100 by, for example, enriching and verifying the registration information obtained from the user as in step 256 of FIG. 6B.

Following step 604, step 608 is encountered wherein a registration application 128 determines whether the present third party website 116 requesting user information (for a user attempting to register at this third party website) requires that a user ID (and optionally password) be generated specifically for this third party website. That is, the third party website 116 may require a user ID and/or password that conforms with a format peculiar to the third party website 116. Note that to perform the step 608, in at least one embodiment information related to the requirements of the present third party website 116 are stored at the registrar website 100. In particular, the registrar website 100 may store a user information request template for each third coordinating party website 116 having access to user information at the registrar website 100 such that a registrar application 128 (upon identifying a particular third party website 116) may access a related user information request template for determining what information may be required by this third party website.

If a user ID and optionally password need not be generated specifically for the requesting third party website 116, then in step 612 the user information requested by the third party website 116 is encrypted and in step 616 the encrypted information is sent to the third party website. Following this, in step 620 a registrar application 128 logs an entry or a record in the registrar access log database 152 indicating that registration information for the user has been transmitted to the present third party website 116. Subsequently, in step 624 a registrar application 128 (or, more precisely, an instantiation thereof) waits for an acceptance response from the present third party website 116 to which the encrypted user information was sent. Note that the response from the present third party website may include a third party website specific user ID (and optionally password) if the user was not previously registered at this third party website. That is, the third party website may automatically generate at least a user ID if the user was not previously registered at the website. Alternatively, it may be the case that the present third party website uses the user's registrar registration user ID and password for registering the user at the third party website 116. Note that in at least one embodiment for registration processing at a third party website 116, the use of the registrar user ID does not create ambiguity in the identity of users registering at the third party website. For example, a user seeking access to a cooperating third party website may be required to indicate that his/her user ID and/or password is a registrar generated user ID (and/or password) so that the third party website can process the entered user identification differently from that of users who have registered without using the present invention. Subsequently, when an acceptance response from the requesting third party website 116 is provided to the registrar website 100 (or, more precisely, a registrar application 128), this response is logged in the registrar access log database 152 in step 628. Following this latter step, in step 632, a determination is made as to whether the response from the present third party website 116 indicates that the user is now registered at this third party website. If no such indication is provided, then in step 636 a message is sent to the user at the user's WWW client node 108 that registrar cannot register the user at the present third party website to which the user has requested registration and access. Further, the registrar application 128 performing step 636 may also supply the user with a reason as to why the user cannot register through registrar at the present party website if such a reason was indicated by this third party website when the response of step 624 was received.

Figure 12:
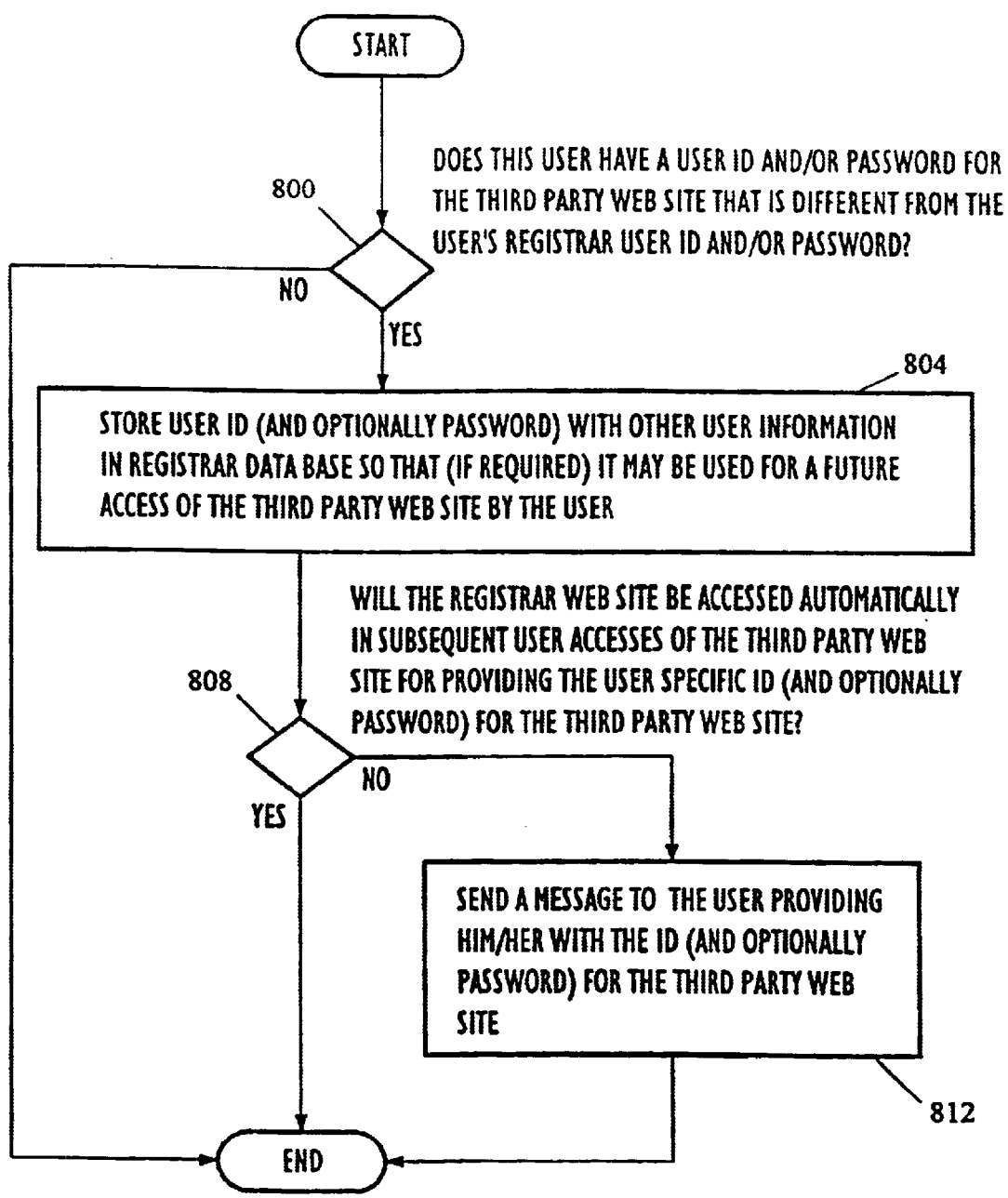
FIG. 12 presents a flowchart of the steps performed when storing in the user registration information database 144 a user's ID (and optionally password) relating to a third party website 116 to which the user is registered via using the present invention.

Alternatively, if in step 632 it is determined that the user is registered at the present third party website, then in step 640 the program corresponding to the flowchart of FIG. 12 is performed for storing at least the user's ID (and optionally password) for the present third party website at the registrar website 100 (more precisely, in the user registration information database 144) as will be discussed hereinbelow.

Referring again to step 608 of FIG. 10A, if a registrar application 128 is required to generate a user ID (and optionally password) for the third party website 116, then step 644 is next performed wherein a registrar application 128 generates a user ID (and optionally password) to be transmitted to the third party website 116. Subsequently, the sequence of steps 648 through 668 are performed. Note that this sequence of steps is substantially the same sequence of steps as steps 612 through 632. However, the response from the present third party website logged in step 664 may include an indication as to whether the user generated by the registrar application 128 is acceptable to the present third party website 116.

Accordingly, continuing the discussion of FIGS. 10A and 10B from step 668, if the response from the present third party website 116 indicates that the user is registered at the desired third party website, then step 672 is performed wherein the program corresponding to the flowchart of FIG. 12 is again used to store the user's ID (and optionally password) for the present third party website in the user registration information database 144 (as in step 640). Alternatively, if in step 668 it is determined that the user is not registered at the present third party website 116, then in step 676 a determination is made as to whether the generated user registration information (i.e., user ID and optionally password) step 644 has been rejected by the present third party website. If so, then in step 680 a determination is made as to whether this rejection has occurred less than a predetermined number of times (i.e., the sequence of steps 644 through 668 have been iteratively performed less than a predetermined number of times in attempting to register the user at the present third party website). If the results of the test in step 680 is affirmative, then step 644 is again encountered for generating alternative user registration information for the present third party web site. Note that it is an aspect of the present invention that, at least in one embodiment, such generations produce user IDs that are meaningful to the user and/or are related to other website registration user IDs for the user. Thus, in one embodiment of the present invention, the step 644 uses the user's registrar user ID as a "seed" from which to generate a user ID acceptable to the present third party website 116. Moreover, note that the generation process of step 644 may use various heuristics and third party web site constraints to generate acceptable user IDs.

Alternately, if the negative branch from step 676 is followed, then the third party website 116 may have rejected registering the user for any of a number of reasons that may not be able to be alleviated in a timely fashion so that the user can be registered at this third party website in a short amount of time. Accordingly, step 684 is encountered wherein a message is transmitted to the user's WWW client node 108 indicating that registrar cannot currently register the user at the requested third party website 116. Further, note that if in step 680 it is determined that too many attempts have been made to generate acceptable registration information for the third party website, then step 684 is also encountered.

The flowchart of FIGS. 10A and 10B is representative of the processing variations for supplying a third party website or message selection logic with registration information. For instance, those skilled in the art will appreciate that steps 624 and 660 may have a timer associated with them whereby if there is no response from the third party website within a predetermined time period, then a default response is provided by a registrar application 128 so that one of the steps 684 or 636 is performed as part of the processing when such a timer expires and subsequent steps in the flowchart are performed. Additionally, other steps may be inserted, for example, on the negative branch from step 676 wherein these additional steps attempt to address other anomalies indicated in the acceptance response received in step 660. For example, if the third party website 116 requests additional user information than what was provided in step 648, then if this additional information is in the user registration information database 144 and the user has indicated that it is permissible to disseminate this information, then the additional information may be transmitted to the present third party website 116. Also, in such a case, the transmittal of this additional information is recorded in the registrar access log database 152.

Figure 11:
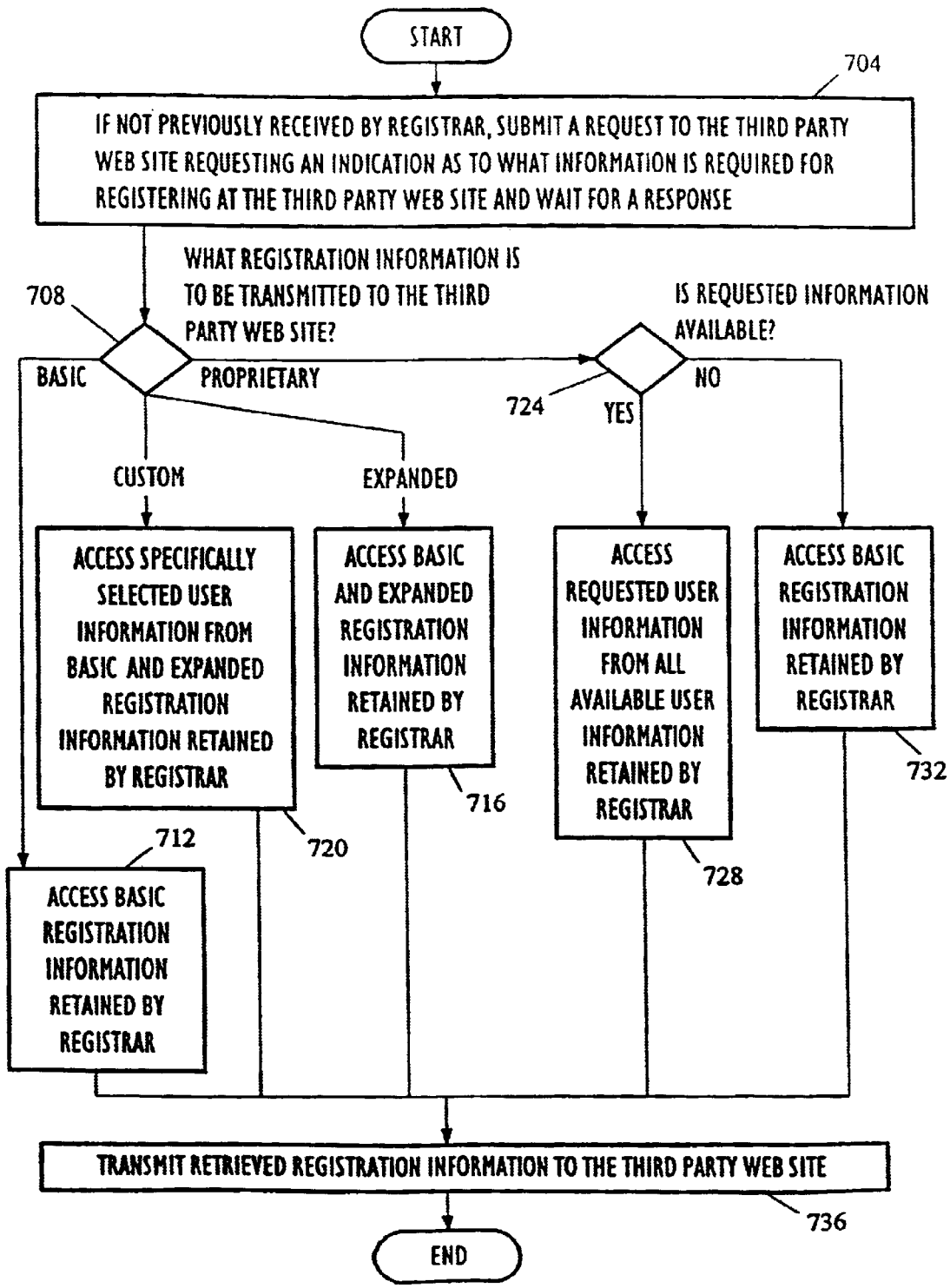
FIG. 11 presents a flowchart of the steps performed by the present invention when supplying a third party website 116 with user registration information from the user registration information database 144.

Referring now to FIG. 11, wherein the flowchart for a program is provided for supplying, from the user registration information database 144, a requesting third party website 116 or message selection logic with registration information related to a particular user. Accordingly, in step 704 of FIG. 11, if the registrar website 100 has not been previously supplied with an indication as to what type of information is required by the requesting third party website, then a registrar application 128 constructs such a request to be transmitted to the requesting third party website and subsequently the application may wait for a response from this third party website. Following step 704, in step 708 it is assumed that the registrar website 100 has been provided with an indication or specification as to what information the requesting third party website desires. Thus, the registrar application 128 performing step 704 may now determine what registration information is to be transmitted to this third party website. Note that at least in one embodiment of step 708, the user registration information requested may require validation according to the following criteria:

(1.1) The type and amount of registration information for a user that the user has indicated is available to be transmitted to a requesting third party website.

(1.2) The type and amount of information the requesting third party website 116 has contracted with the registrar website 100 for transmitting regarding a particular user or category of users.

(1.3) The registration information available in the user registration information database 144.

Thus, as discussed with respect to step 604 of FIG. 10A, either basic, expanded, custom or proprietary registration information related to a user is transmitted to the requesting third party website in step 736.

FIG. 12 presents a flowchart for storing, in the user registration information database 144, a user's ID and/or password for a third party website 116 to which the user is registered using registrar. More precisely, the user ID and/or password for such a third party website is stored via the steps of FIG. 12 if this information is different from the user's registrar user ID and/or password. That is, it is believed that for many third party websites 116, the registrar user ID and password for users registered at the registrar website 100 will be identical to the user's user ID and password at third party websites. Note that there are significant advantages to third party websites 116 using, for each registered user, the user's registrar user ID and password (or, some other user ID and password in common with other third party websites to which the user is registered). For instance, a user is required to remember fewer user IDs and passwords associated with websites and the websites providing this convenience may have a higher volume of users accessing the website due to the greater ease of access.

Regarding the steps of FIG. 12, in step 800 a determination is made as to whether the user has been provided with a user ID (optionally password) for the third party website 116 (to which the user is attempting to register) that is different from the user's registrar user ID and/or password. If not, then there is nothing additional to store at the registrar website 100 and the flowchart ends. Alternatively, if the decision of step 800 results in a positive answer, then step 804 is performed wherein the user's specific user ID and optionally password for this third party website is stored with other user registration information in the user registration information database 144. Note the following advantages accrue by storing user registration information at the registrar website: (a) each user has the convenience of off-site storage backup for each such third party website to which the user is registered and (b) depending on the registration process at the third party website, it may be expedient for such a website (at least temporarily) to automatically contact the registrar website 100 for retrieving, for example, the user's third party website specific user ID upon subsequent user accesses to the third party website.

Following step 804, in step 808 a determination is made as to whether the third party website has indicated that it will initiate requests as in (b) immediately above. If so, then no further processing needs to be accomplished here in that the user may enter his/her user registrar website 100 user ID (and optionally password) when accessing the third party website. Alternatively, if step 808 yields a negative answer then step 812 is performed wherein the registrar website 100 sends a message to the user at the user's WWW client node 108 providing the user with the ID (and optionally password) for the third party website.

In an alternative embodiment, a registrar registration module 156 may be provided at the user's WWW client node 108. This module (whether incorporated into the WWW browser 120 or external to the browser and communicating with the browser through, for example, a browser 120 port) may store locally at the client node 108 registration information for accessing third party websites 116 to which the user has registered or for use in selecting targeted messages. In FIGS. 13–17, flowcharts are provided for programs illustrating the processing of this alternative embodiment of the present invention.

Figure 13:
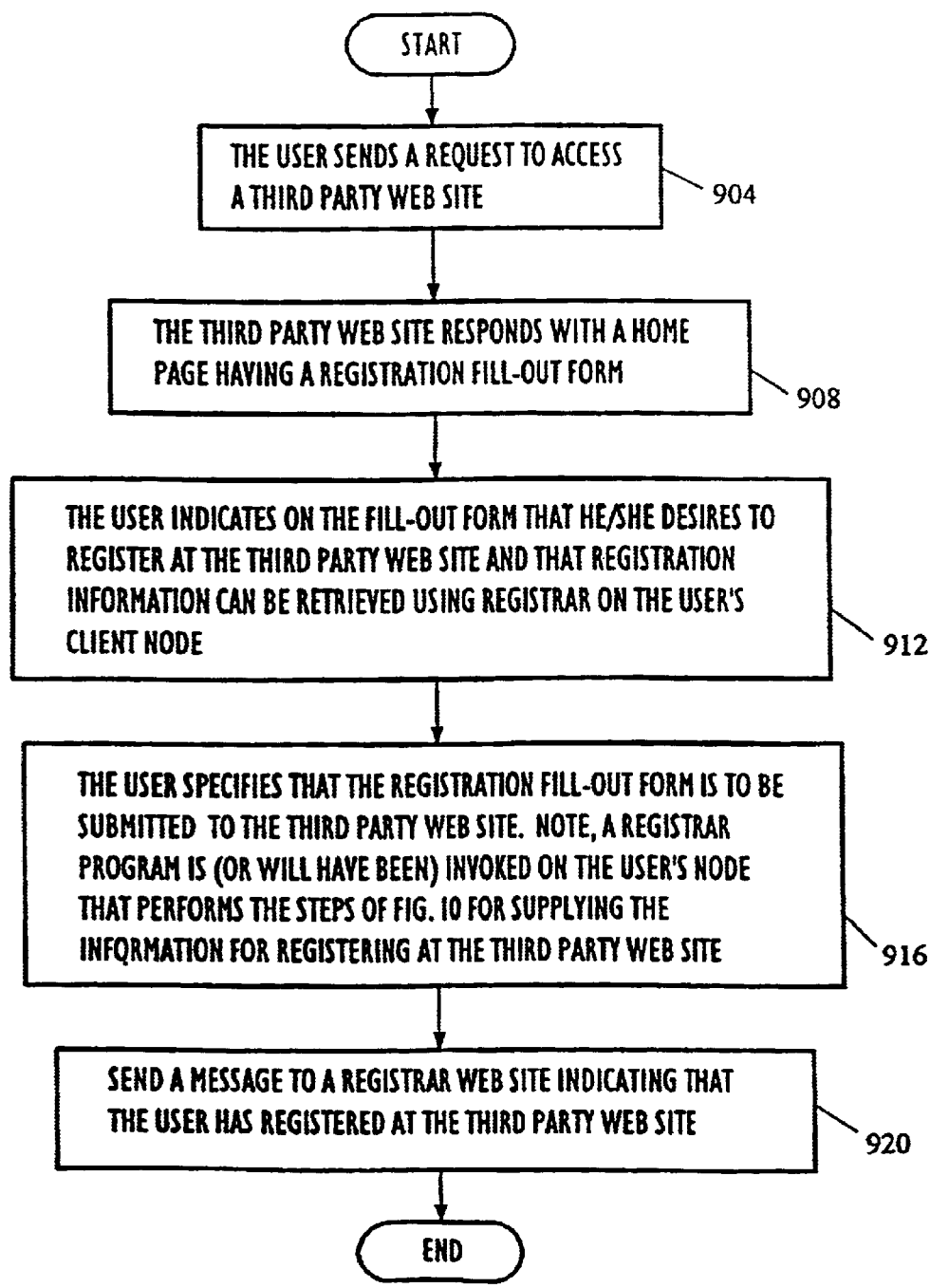
FIG. 13 is a flowchart of the steps performed when registering at a third party website 116 using the module 156 of the present invention installed on the user's client node 108.

In FIG. 13, a flowchart is presented of the program for registering at a third party website 116 when the module 156 is installed on the user's client node 108.

Describing now the steps of FIG. 13, in step 904 the user sends a request to access a third party website 116 via the user's WWW browser 120. Subsequently, upon receiving the request, the accessed third party website 116 responds with a home page having a registration fill-out form (step 908). Assuming that the registration fill-out form allows the user to indicate that user registration information may be obtained locally at the client node 108, in step 912 the user indicates on the fill-out form that he/she desires to register at the third party website and that his/her registration information can be retrieved using the registrar registration module 156 residing on the user's client node 108. Further note that the user may be required to activate or alert the module 156 so that this module can supply the appropriate user registration information to be communicated to the third party website 116. Also note that the home page from the third party website 116 may indicate the type of information required to register the user and this information may be used either manually or automatically for determining the user registration information stored on the user's client node 108 that will be transmitted to the third party website. Subsequently, in step 916 the user specifies that the registration fill-out form is to be submitted to the third party website. Accordingly, the WWW browser 120 communicates with the registrar registration module 156 to supply the registration information to the third party website. That is, the processing performed here includes the steps of FIG. 14 which are described herein below. Subsequently, in step 920 a message is sent from the registration module 156 to the registrar website 100 indicating that the user has registered at the third party website and additionally supplying the registrar website 100 with any user ID and password specific to the third party website. Note that by sending this information as well as, for example, a copy of substantially all of the user's registration information stored locally to the registrar website 100, the user is provided with an automatic off-site backup of his/her registration information. Additionally, the user may be provided with other advantages by providing his/her user registration information to the registrar website 100. In particular, the registrar website 100 may enrich the user's registration information with publicly available information on the user and alert the user to discrepancies between the user information and various publicly available records on the user.

Figure 14:
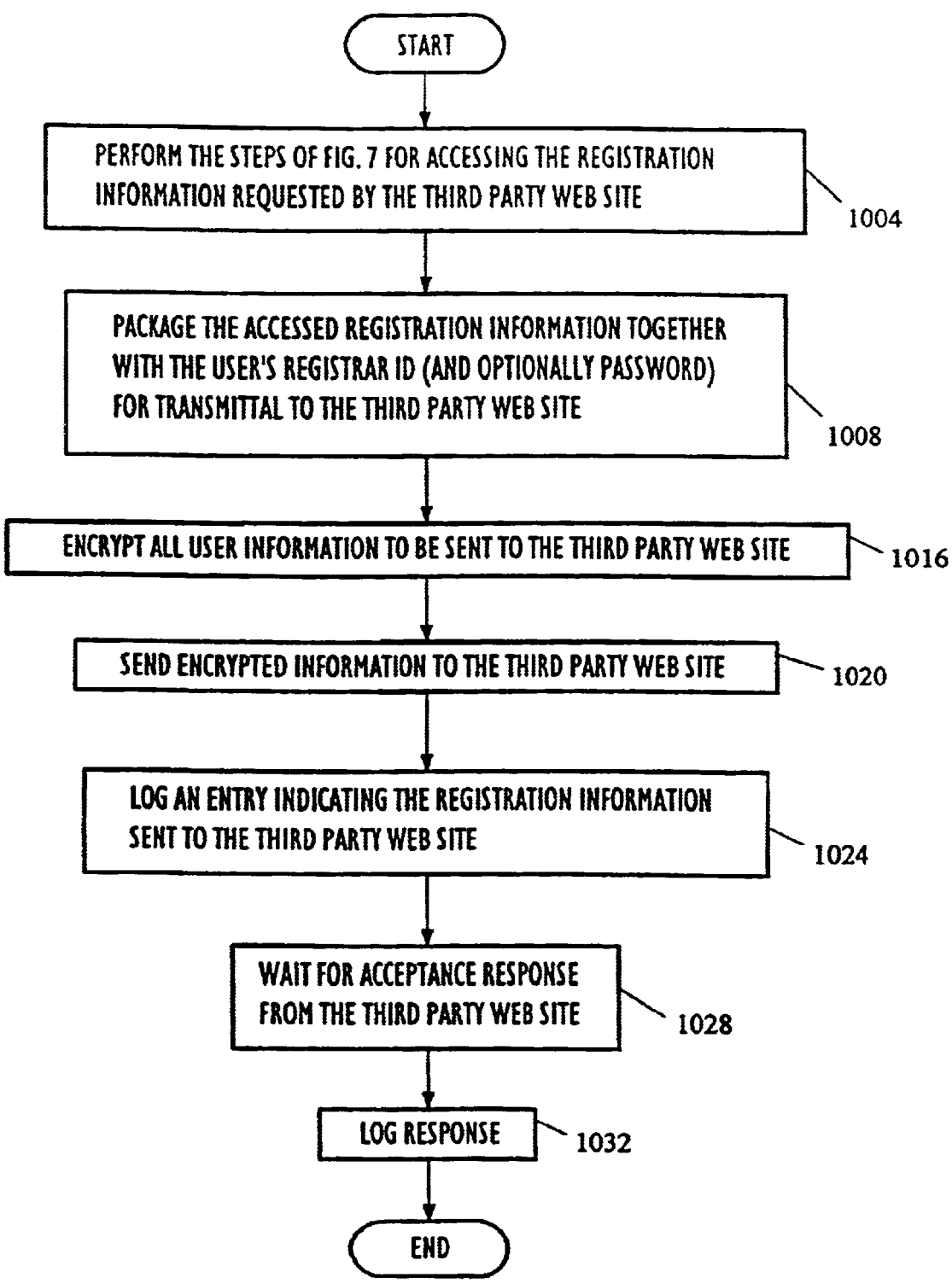
FIG. 14 is a flowchart of the steps performed when the registration module 156 on the user's client node is utilized in supplying a third party website 116 with registration information.

Referring now to the flowchart of FIG. 14, this flowchart describes the steps performed when supplying a third party website 116 or message selection logic with registration information retained by the registrar registration module 156 on the user's node. In step 1004, the steps of the flowchart of FIG. 11 are performed for retrieving the registration information requested by the third party website. Subsequently, in step 1008 the registrar registration module 156 packages the accessed registration information for the third party website together with the user's registrar ID (and optionally password) for transmittal to the third party website. Subsequently, in step 1016 the registration information packaged together in step 1008 is encrypted so that in step 1020 this encrypted information may be sent securely to the third party website via the World Wide Web 104. Following this, in step 1024 the module 156 logs an entry into a local log on the client node 108 indicating what registration information was sent to the third party website. Subsequently, in step 1028 a process may be instantiated to wait for an acceptance response from the third party website so that when such a response is obtained it may be logged locally at the client node 108 in step 1032.

In one embodiment the user may configure the registrar registration module 156 to log all activities with third party websites 116 and provide the records of this log to the registrar website 100. This allows the registrar website 100 or personnel that maintain the registrar website 100 to analyze user activities on the World Wide Web 104. Such analysis may be useful to both registrar users and third party website personnel in that, given a user's World Wide Web 104 activity, the registrar website 100 may suggest additional third party websites 116 of which the user may not be aware. Further, by analyzing the user access logs of registrar users, the registrar website 100 may provide statistics to the third party websites 116 as to the number and types of users accessing their respective websites.

Figure 15A:
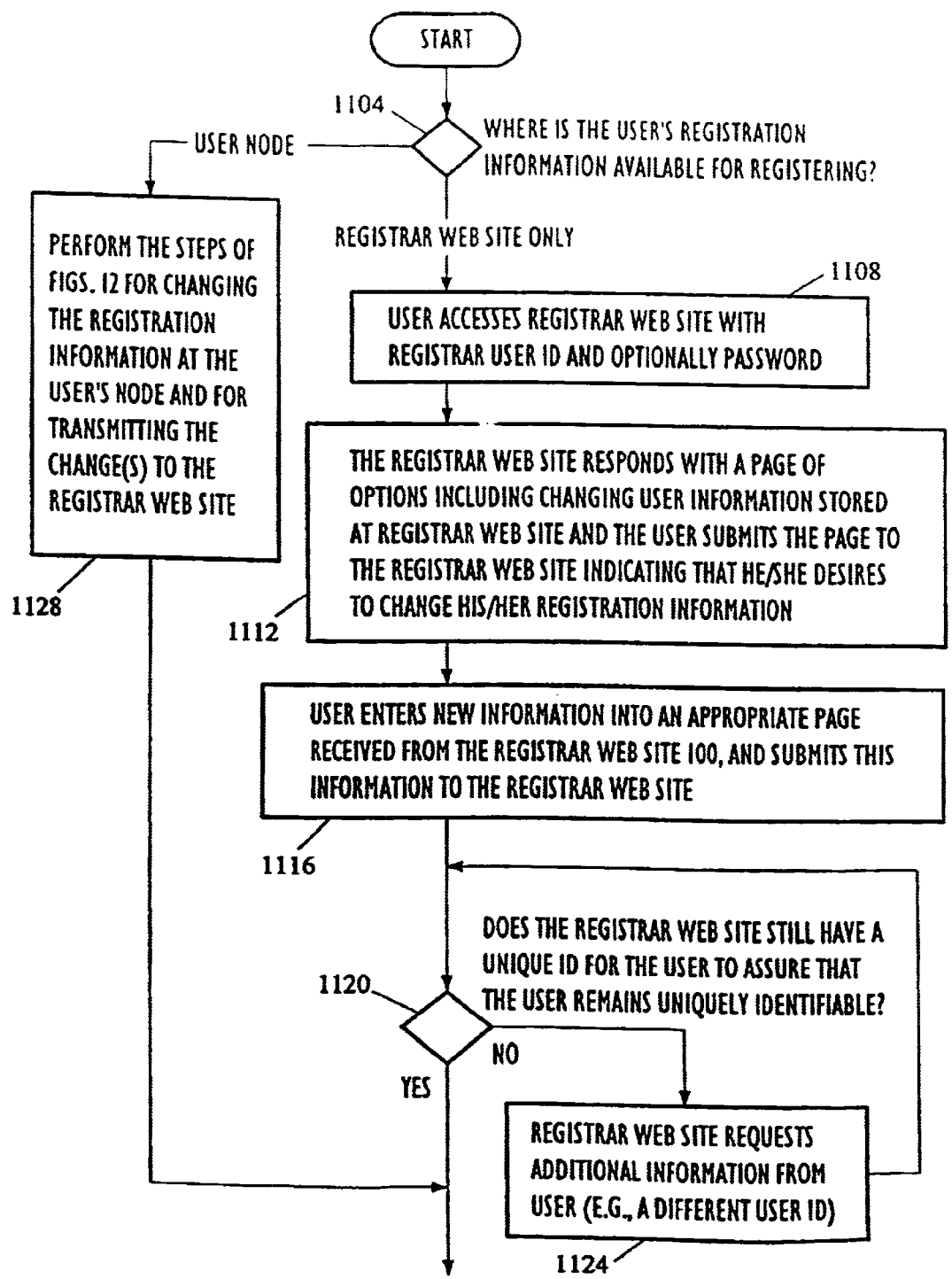
FIGS. 15A and 15B present a flowchart of the steps performed when a World Wide Web user of the present invention changes his/her registration information stored in the present invention.
Figure 15B:
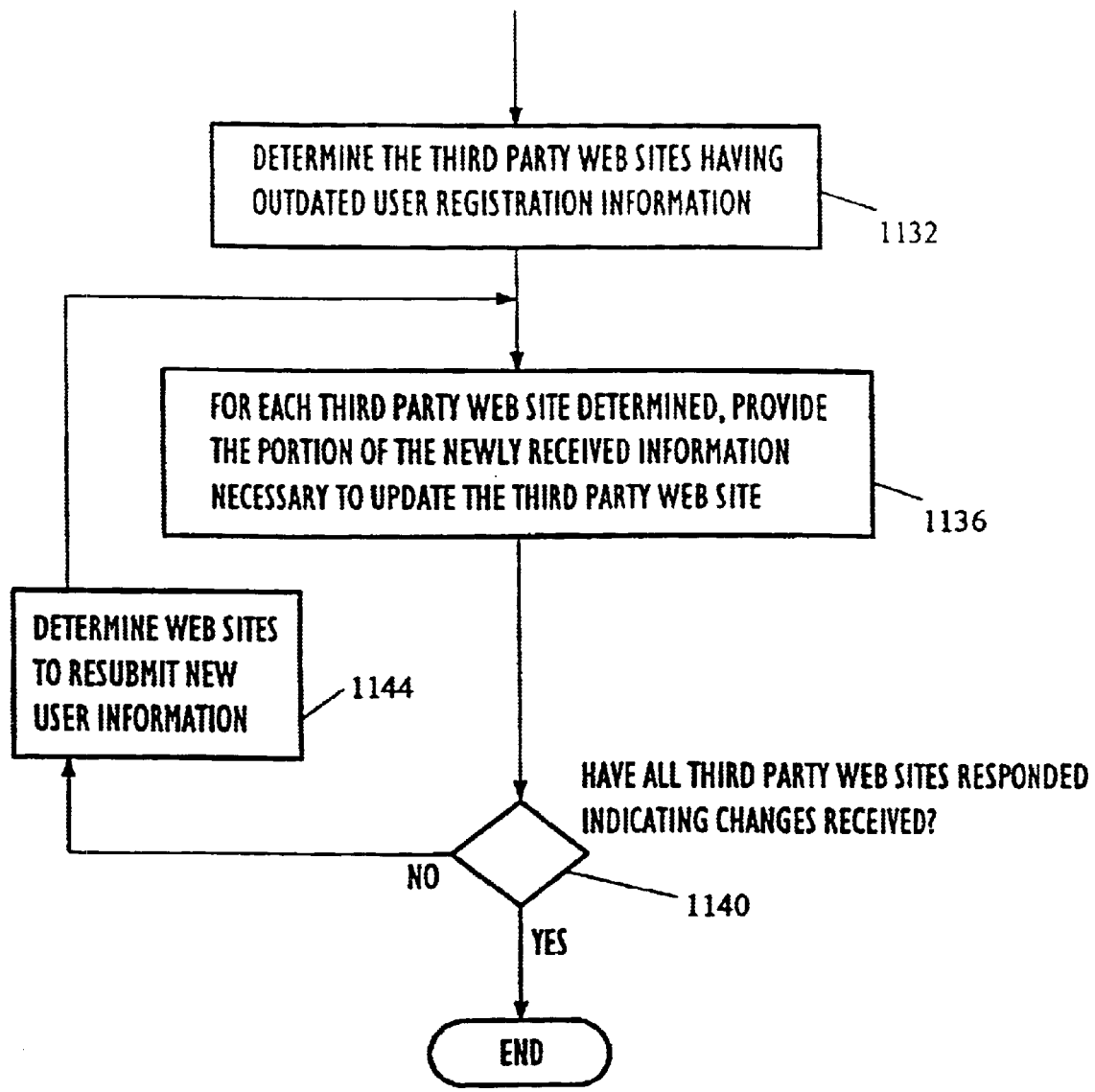

FIGS. 15A and 15B present a flowchart for the steps performed the user changes his/her registrar registration information. That is, the flowchart of FIGS. 11 encompasses both the architecture or embodiment wherein the user's registration information is stored substantially only at the registrar website 100, and also the architecture or embodiment wherein the user's registrar information is also stored at the user's client node 108. Accordingly, in step 1104 a determination is made as to where the user's registration information is stored. Note that this step 1104 is unlikely to be explicitly performed by either the registrar or the user. Instead, the embodiment determines which of the paths from this step to follow (i.e., if module 156 exists, then the "USER NODE" branch is followed; otherwise, the "REGISTRAR WEBSITE ONLY" branch is followed). Accordingly, assuming that the registrar is embodied such that the user's registration information is stored at the website 100 only, then step 1108 is encountered wherein the user accesses the registrar website 100 from his/her WWW client node 108 by entering his/her user ID and optionally password. Subsequently, in step 1112 the registrar website 100 responds with a web page having a number of options related to the user's registration information and registrar website 100 processing of this information. Note that such options include a request by the user to modify the user's registration information stored at the registrar website. Additionally, other options may be also provided to the user including: (a) an option for requesting to be no longer affiliated with the registrar website 100 and have all the user's registration information deleted; (b) an option for requesting to examine all information regarding the user stored at the registrar website 100, including all information the registrar website has obtained from publicly available sources; (c) a request for procedures and/or addresses to contact publicly available databases that registrar has accessed obtaining incorrect user information; and (d) third party websites 116 that are providing information for a limited period of time and for which the user may be interested. Following step 1112, in step 1116 the user enters new information into an appropriate fill-out form received at the user's WWW client node 108 from the registrar website 100. Note that this form is likely to be in a page different from the page of options described in step 1112. That is, upon submission of the page of options, the registrar website 100 responds with a new page(s) having fill-out forms with the presently stored user registration information presented in the forms so that the user may change any of the fields on this page(s).

Note that in at least one embodiment, the user is allowed to change his/her registrar user ID and/or password. However, it may be the case that when a user changes his/her registrar user ID, that the new requested user ID has already been assigned to another registrar user. Thus, the registrar website 100 may respond with a request for further information (such as a request for a different user ID from the user) wherein when the user submits the additional information, the registrar website 100 again checks to determine if the user is uniquely identifiable. Note that the loop of steps 1120 and 1124 are provided to represent the iterative process described here of changing the user's user ID. Further note that in some embodiments of the present invention, the registrar website 100 may respond with alternative variations for a new user ID so that the user is not left to guess at a registrar user ID that is acceptable for uniquely identifying the user.

Returning now to step 1104, if the user's registration information is stored locally at the user's client node 108, then step 1128 is performed instead of the steps 1108–1124. However, for simplicity, a discussion of the processing performed in step 1128 is not described in detail here. Instead, a detailed discussion of this step is provided by FIG. 16 and the discussion of FIG. 16 hereinbelow for changing the registration information at the user's client node 108 and for transmitting the changes to the registrar website 100.

Regardless of the branch of processing taken from step 1104, eventually step 1132 and the subsequent steps of FIG. 15B are encountered wherein the registrar updates or alerts third party websites or message selection logic having previously received user registration information that this information may be outdated. Thus, the steps 1132–1140 are performed so that the registration information provided to such third party websites or message selection logic via the present invention is consistent with the newly supplied user registration information. However, in at least one embodiment, prior to providing any newly entered user registration information to the third party websites or message selection logic, such information may be compared or correlated with publicly available information regarding the user that is, for example, accessible via certain third party websites 116. Further, the user may request his/her newly entered registration information by supplied to only selected websites to which the user is registered, or alternatively, the user may request that the newly entered registration information be supplied to all websites to which the user is registered.

Figure 16A:
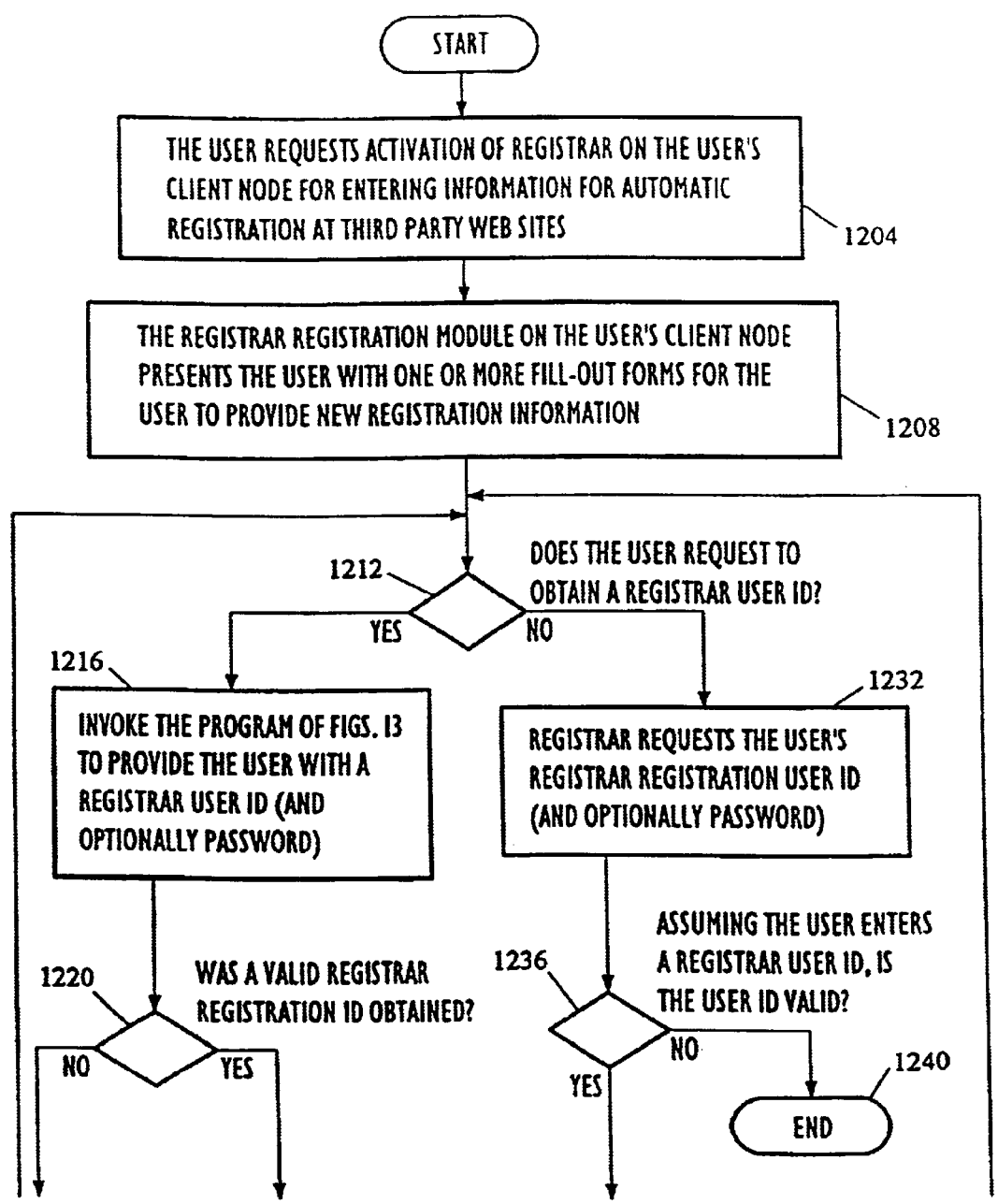
FIGS. 16A and 16B present a flowchart of the steps performed when the architecture of the present invention includes the registration module 156 provided at the user's client node 108 and the user requests to enter registration information into the present invention using this module.
Figure 16B:
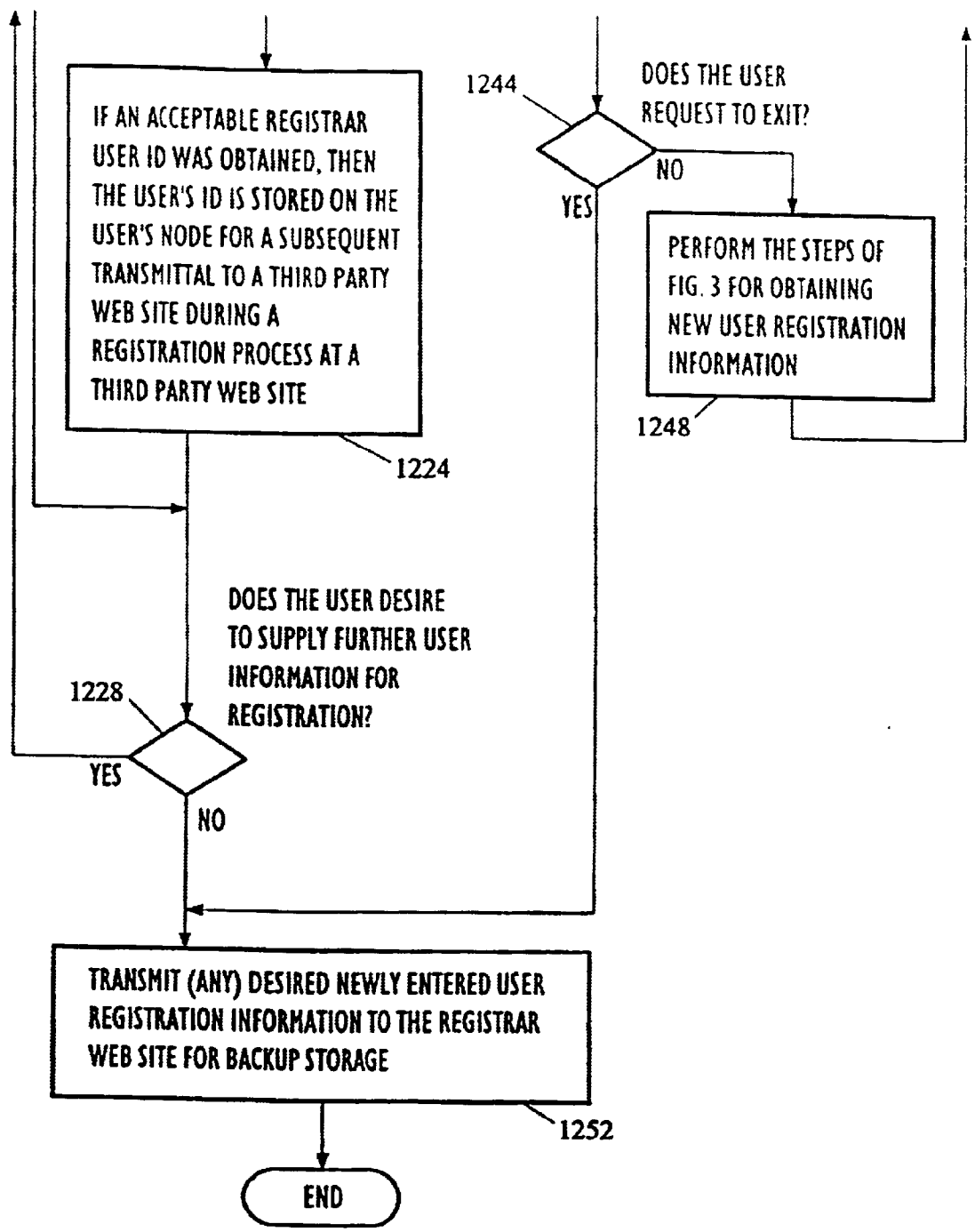
Figure 17A:
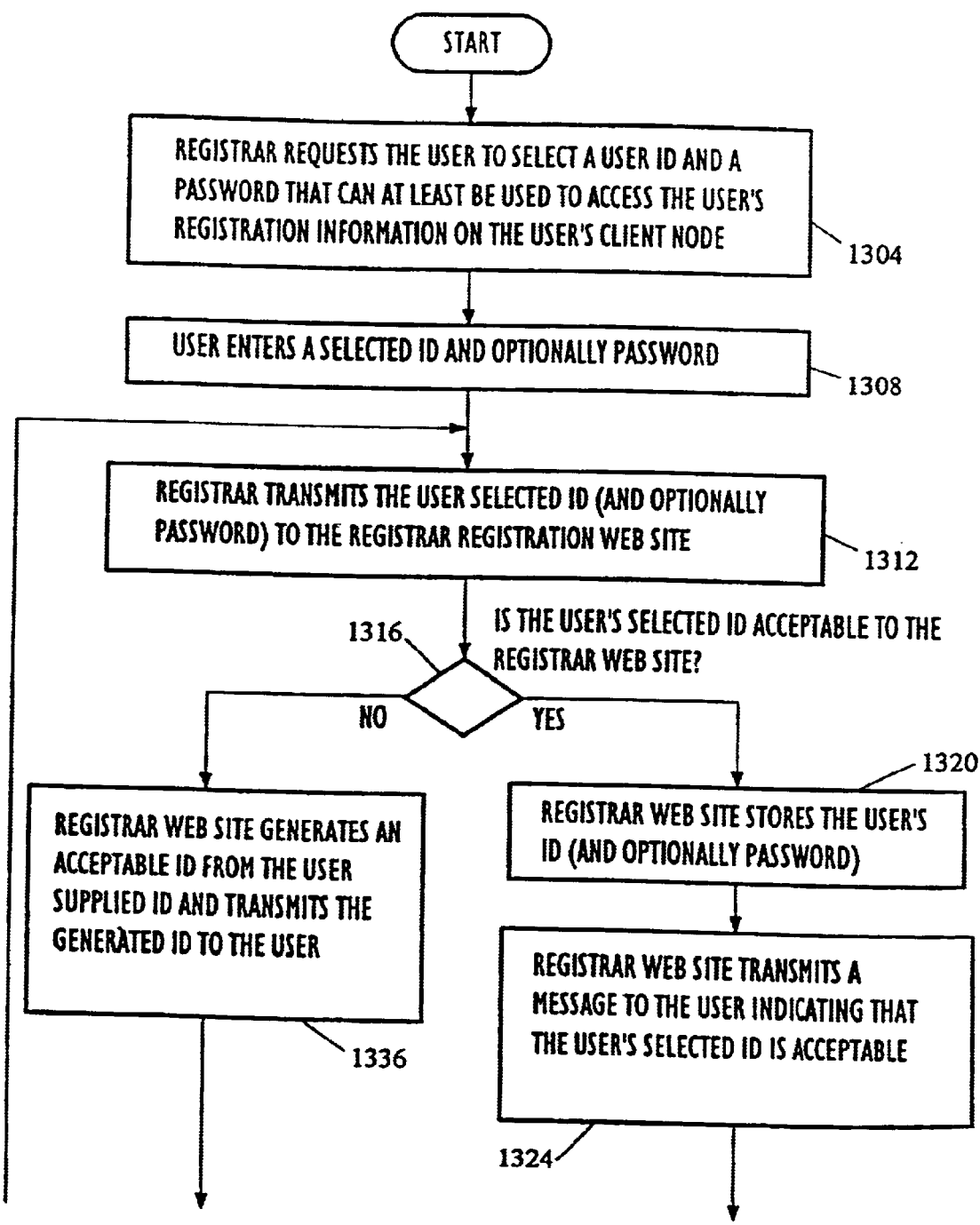
FIGS. 17A and 17B provide a flowchart of the steps performed when a World Wide Web user requests a user ID for the registration information processing system of the present invention and the present invention includes module 156 on the user's client node 108.
Figure 17B:
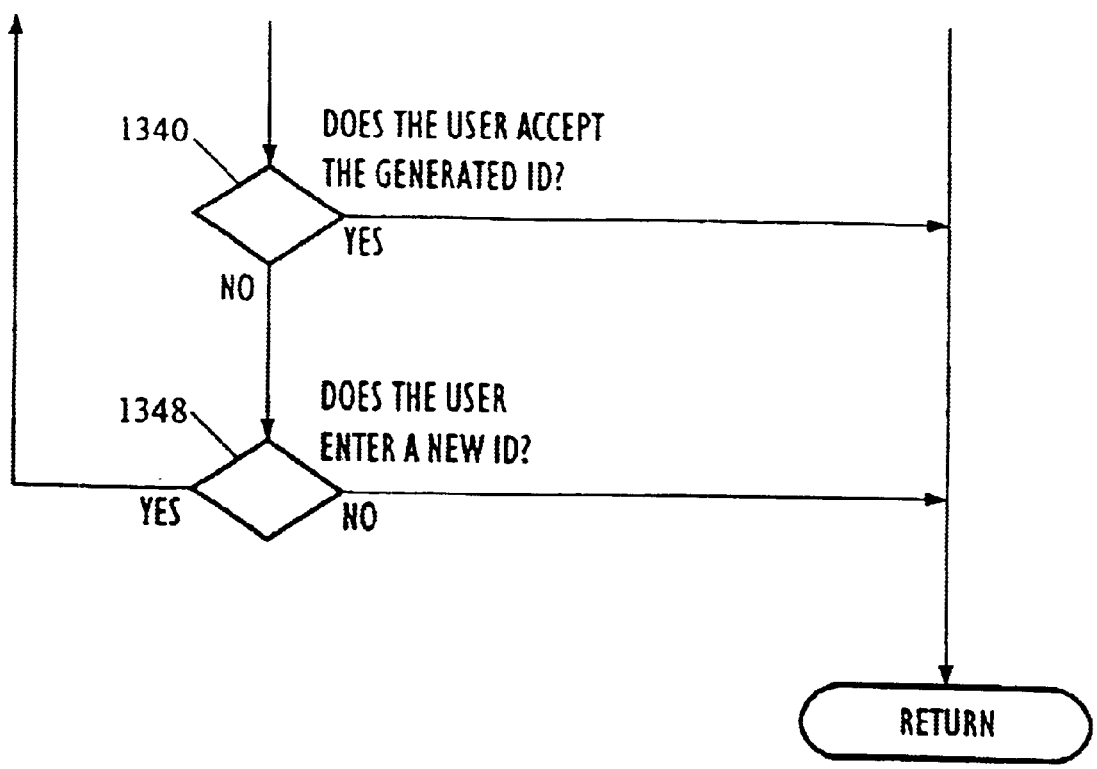

FIG. 16 presents a flowchart of the steps performed when the registrar registration module 156 is provided at the client node 108 and the user enters registration information into this module. Note that the steps of this flowchart may be performed when the user is entering registration information for registering the user with registrar, or when modifying registration information already supplied to registrar. Accordingly, in step 1204 the user requests activation of the registrar registration module 156 on the user's client node 108 for entering information that will subsequently be used for registering substantially automatically cooperating at third party websites 116 requested by the user. Subsequently, in step 1208 the registrar registration module 156 on the user's client node 108 presents the user with one or more fill-out forms for the user to provide new registration information. Following this, in step 1212 a determination is made as to whether the user requests to obtain a registrar user ID. If so, then in step 1216 the program corresponding to the flowchart of FIG. 17 is performed to provide the user with a valid registrar user ID and optionally password.

Subsequently, in step 1220 a determination is made as to whether the program of FIG. 17 returns a valid registrar user ID. If so, then step 1224 is performed wherein the new user's registrar ID is stored on the user's node 108 for a subsequent transmittal to a third party website during a registration process at a third party website that accepts the registrar user ID as the website's ID. Subsequently, regardless of the path taken from step 1220, step 1228 is encountered wherein a determination is made as to whether the user desires to enter further user registration information.

If the user desires to enter further information, then step 1212 is again encountered and a determination is made once again as to whether the user requests to obtain a registrar user ID. However, it is important to note that the steps provided in this flowchart are only an indication of the processing provided by the registrar registration module 156 and the user's browser. In particular, since the user interfaces typically used by World Wide Web browsers allow a user to select the fill-out form fields to modify, the positive branch from step 1212 is taken only when the user enters information in a fill-out form field indicating that a registrar user ID is requested. Similarly, the negative branch from step 1212 is taken whenever user information is entered into other fill-out form fields unrelated to obtaining a registrar user ID.

Accordingly, if the user desires to enter other information than that required to obtain a registrar user ID, then from step 1212, step 1232 is encountered wherein the registrar registration module 156 explicitly requests the user's registrar registration user ID (and optionally password). Subsequently, in step 1236, assuming the user enters a registrar user ID, a determination is made as to whether the registrar user ID is valid. Note that this determination is initially made locally at the user's client node 108 without contacting the registrar website 100. However, in one embodiment, it is an option that if the registrar user ID entered is not found in the client node 108, then the registrar registration module 156 may inquire of the user as to whether he/she desires the registrar website 100 to be interrogated for the registrar user ID and password and, if found, download the user's registration information to the user's client node 108. If no valid registrar user ID is determined in step 1236, then the program ends in step 1240. Alternatively, if a valid registrar user ID is obtained, then in step 1244 a determination is made as to whether the user requests to exit the present program and thereby stop supplying registration information. Note that this step is similar to step 1212 in that if the user continues to enter registration information in fill-out form fields, then the negative branch from this step is followed and, alternatively, if the user, for example, activates an exit button on the user interface, then the positive branch from step 1244 will be followed. Accordingly, if the negative branch is followed, then in step 1248 the program of FIG. 7 is performed for obtaining new user registration information and, subsequently, step 1212 is encountered (or, more precisely, the user interface is provided that allows the user to request a registrar user ID).

Alternatively, if the positive branch is taken from step 1244, then step 1252 is encountered wherein the registrar registration module 156 transmits (or schedules the transmission of) any newly entered user registration information that the user desires to be transmitted to the registrar website 100 for backup storage. Thus, in one embodiment, the step 1252 provides the user with the option to discard the registration information provided in step 1248 above instead of transmitting this information to the registrar website 100.

In FIG. 17, a flowchart is presented of the program for obtaining a registrar user ID and optionally password for the embodiment the registrar registration module 156 retains the user's registrar user ID (and optionally password) for automatically providing to websites at which the user requests registration or to which the user releases information for use in targeted message selection. Accordingly, in step 1308 the registrar registration module 156 requests the user to select a registrar user ID and optionally a password that can be used to access the user's registration information at both the user's client node 108 and at the registrar website 100. Assuming that the user enters a user ID and optionally password in step 1308, in step 1312 the registrar registration module 156 transmits the user selected ID and optionally password to the registrar website 100. Subsequently, in step 1316 a determination is made by the registrar application 128 as to whether the user's selected user ID and optionally password are acceptable to the registrar website. That is, a registrar application 128 accesses the user registration information database 144 to determine if the selected user ID is sufficiently unique. Note that other steps may be performed between steps 1308 and 1312. For example, the syntax for user IDs and optionally passwords may be checked at the module 156 prior to transmitting the user's selected registration information to the registrar website 100.

Continuing with step 1316, a determination is made at the registrar website 100 as to whether the user's selected user ID and optionally password are acceptable to registrar. If so, then in step 1320 a registration application 128 stores the user's ID and optionally password in the user registration information database 144. Note that since it is unlikely that any further information related to the present user is stored at the registrar website, the process of storing the user's user ID and optionally password includes creating a new record in the database 144 and marking all remaining fields related to registration information for this user to indicate that these fields are as yet not valid. Following this, in step 1324 a registrar application 128 transmits a message to the user's WWW browser 120 indicating that the user's selected user ID and optionally password is acceptable to registrar.

Alternatively, if the negative path is taken from step 1316, then step 1336 is encountered wherein a registrar application 128 attempts to generate an acceptable user ID and optionally password as a substitute for the user's proposed user ID (and optionally password). Note that in generating alternative registration information, the registrar application 128 may use the user supplied information as the basis or "seed" for generating an acceptable user ID (and optionally password) to be transmitted back to the user. Accordingly, in step 1340, once the user is presented with the newly generated registration information on the user's client node 108, the registrar registration module 156 provides the user with the option to accept or reject the generated information. If the user accepts the generated registration information, then the flowchart ends. Alternatively, if the user rejects this information, then in step 1348 a further determination is made by the module 156 as to whether the user enters a new user ID (and optionally password) as an alternative to the generated registration information. If such new user registration information is provided, then step 1312 and steps thereafter are again performed in attempting to provide a registrar user ID (and optionally password) to the user. Alternatively, if the user indicates in step 1348 that no further proposed candidates for a user ID (and optionally password) will be forthcoming, then the flowchart ends without an acceptable registrar user ID being obtained.

The preceding description is directed to the selective transmission of registration information for registration purposes. It will be appreciated that the architectures and methodologies described above can be used in other contexts where the user desires to selectively disseminate user information. For example, the user may desire to transmit user contact information (such as a name, residence or business address, URL or phone number) and/or financial information (such as credit card numbers or other account information) in connection with electronic commerce transactions over the internet, applying for a loan or club membership over the internet, or various other purposes. In addition, a user may wish to selectively disseminate information regarding certain goods or services. In the context of air travel, a user may from time to time wish to transmit information regarding seating preferences, meal preferences, routing preferences (e.g., non-stop flights), passport numbers and the like to one or more airlines and/or travel agents. Similarly user information may be transmitted in connection with identifying music, books, hotels, clothing (e.g., clothing size information) or other goods or services using the internet. Moreover, a user may wish to make personal records such as medical records and investment records available for transmission over the internet as may be desired. Information regarding lifestyle interests such as favorite sports, magazine subscriptions and the like may also be stored for selective transmission.

The storage of a user information repository has a number of advantages in such contexts. First, the ability to manually enter such information, that may be re-used from time to time, saves time, reduces annoyance, and reduces the opportunity for data entry errors. In addition, by transmitting such information via secure transmissions, the likelihood of accidental or fraudulent dissemination of sensitive subject matter is reduced.

It will be appreciated that such a user information repository may be implemented in many ways. For example, user information may be stored at a dedicated site similar to the registration site discussed above. Alternatively, the user information may be stored at the user's website with appropriate modules for facilitating selective transmission. Alternatively, the user information may be stored on a non-dedicated site to which the user has previously transmitted user information together with information concerning retransmission. For example, the user information may be accumulated and stored in connection with a portal site such as are increasingly being used as a starting point for internet sessions.

Figure 18:
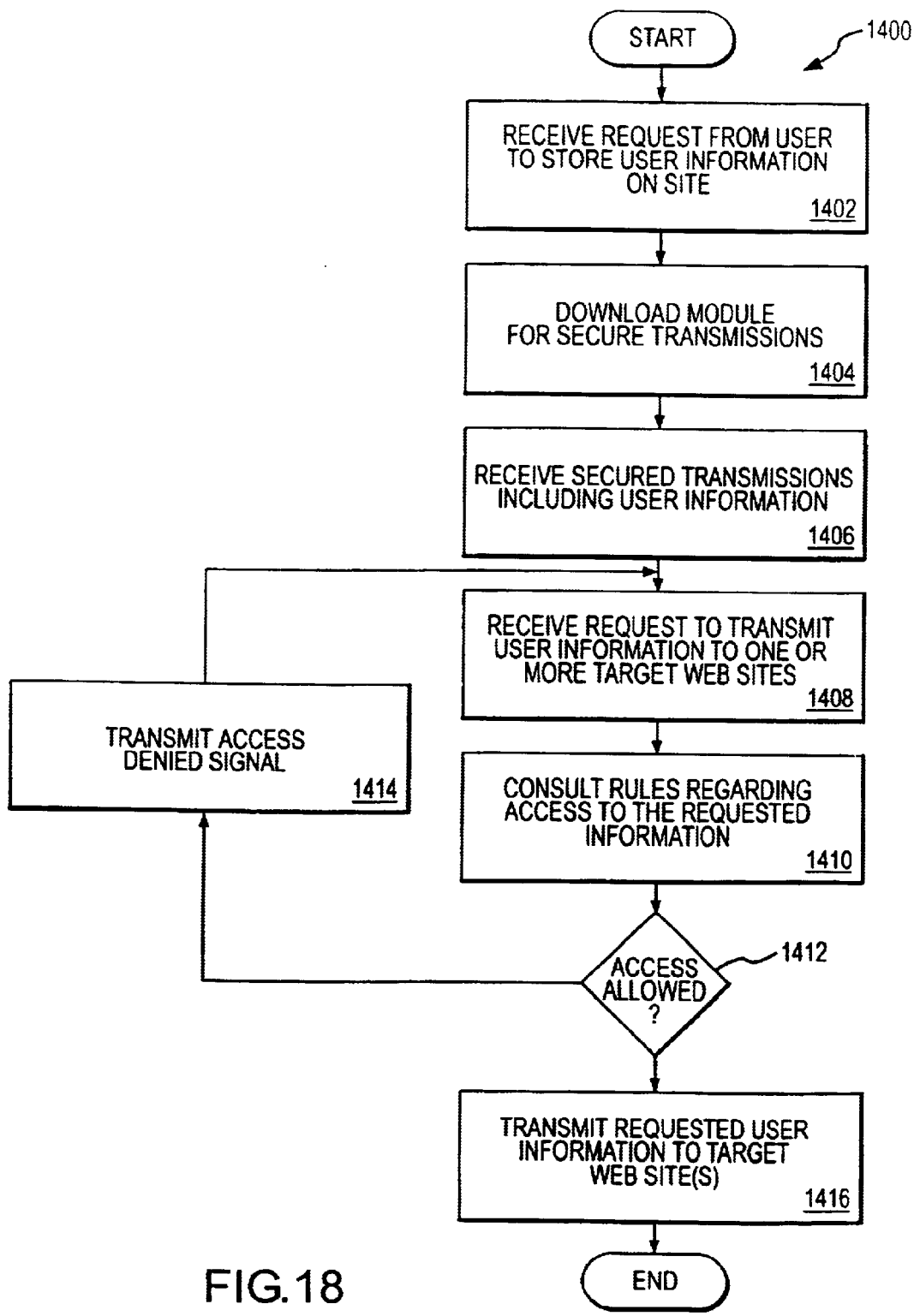
FIG. 18 is a flowchart illustrating the operation of a user information site in accordance with the present invention.

FIG. 18 is directed to a preferred implementation involving a dedicated site for receiving user information and disseminating the user information using secured transmissions. However, it will be appreciate that the user information repository is not limited to any such particular implementation.

FIG. 18 is a flowchart illustrating a process 1400 implemented by dedicated website for receiving and selectively disseminating user information ("information site"). The process is initiated by receiving (1402) a request from a user to store user information on the information site. For example, the user may contact the information site using a web browser and use prompts associated with the information site home page to indicate a desire to store user information. In response, in the illustrated implementation, the information site prompts the user to download (1404) a module for allowing secure transmissions between the user and the information site over the internet. For example, the module may include logic for encrypting transmissions from the user and decrypting encrypted transmissions from the information site to the user.

Once the module has been installed on the user node, the information site receives (1406) secured transmissions from the user including user information. The types of user information received at the information site will depend on the interests and desires of the user. In this regard, some users may desire to store only certain user contact information such as a URL but may be uncomfortable providing detailed financial information such as credit card numbers. Other users may wish to store such sensitive information in order to facilitate financial transactions over the internet. Optionally, the user information supplied by the user may be supplemented by information obtained from public sources, information regarding patterns of website visits by the user and related information of so-called cookies, and other sources available for use in deriving a user profile.

In the illustrated implementation the user is allowed to select the types of information that will be stored on the information site. However, the information site administrator may define minimum, mandatory information fields. Preferably, the user can fill in selected pages of information of interest to the user such as, for example, an air travel preference page, a lodging preference page, a general financial information page, a client contact page, etc. The information collected on each page is preferably stored in fields so that the user can better control the information which is disseminated and so that only the particular information required for specific transactions needs to be transmitted thereby promoting data transmission efficiency. Moreover, in the illustrated implementation, the user can associate different security levels with different pages of user information and/or specific information fields. In this regard, a user may be willing to allow dissemination of certain information, such as user contact information, to categories of websites, e.g., travel agencies and airlines, or any website registered in a database of the information site. The user may desire a higher level of security for other types of information such as account numbers. In such cases, the information site may store a security code associated with such sensitive information. The user can then regulate access to such information by controlling access to the security code. Alternatively, the user may require voice channel confirmation or other case by case confirmation before releasing such information. For example, the user may require notification by e-mail, phone, facsimile, express mail or other means prior to releasing certain information. In this manner, the user has an opportunity to deny or limit access to such information. A set of rules are thereby defined for controlling dissemination of the user information.

To further ensure confidentiality and instill user confidence, a trusted agent such as an auditing firm may be employed to audit and control operation of the information site so as to ensure appropriate use of all user data and provide periodic certificates reflecting user information dissemination. For example, the agent could periodically or annually cause all information in the information site to be transmitted, periodically or on request, in electronic or other form, to the user for independent review and confirmation.

After the user information has been stored at the information site, the site may from time to time receive (1408) requests to transmit user information (all of the stored information or a portion thereof) to one or more target websites. Such a request may come in various ways. For example, the user may refer a target website to the information site in order to facilitate a transaction between the user and the target website. Alternatively, a target site may initiate a request for user information without prior communications between the target website and the user. Moreover, the user may request dissemination of the user information to target websites without prior communication between the user and the target websites.

Upon receiving the request, the information site consults (1410) the rules regarding access to the requested user information. In the simplest case, the rules may indicate that the requested information may be disseminated to any one requesting the information. In other cases, the rules may only allow release of the requested information upon receipt of an identification code, password and/or other indication that the user has granted permission to disseminate the requested information. In still other cases, as noted above, more stringent security measures may be implemented prior to releasing the information.

Based on such rules, the information site makes a determination (1412) as to whether access to the requested information should be allowed. If the rules indicate that access should not be allowed, the information site transmits (1414) an access denied message to the requesting party, e.g., a third party website or logic for selecting targeted messages for display or playback during Internet session waiting time. If desired, when an access denied message is transmitted to a third party requester, the information site may also notify the user of the attempted access and the identity of the requesting party. Such information may also be stored in a database to help identify regularly offending parties.

If the rules indicate that access should be allowed, then the information site proceeds to transmit (1416) the requested user information to the target website or sites. It will thus be appreciated that the invention allows users to store user information for substantially automatic retransmission as desired. The invention is particularly advantageous with respect to disseminating types of information that are repeatedly utilized in Internet transactions. In addition, the invention has substantial benefits relating to security for transmitting sensitive user information.

Moreover, the invention is useful to help the user identify information of interest. In this regard, the personal information could be used, for example, to direct the user to other sites of interest (e.g., "from your profile, we note that you wear size 15 shoes and have visited WWW site XXX that sells larger shoe sizes. Here is a listing of other sites on the internet where you can buy larger sized shoes.") In order to keep the user information updated, the user can change or add to the user information as desired, for example, electronically, by phone or by mail. In addition, to facilitate acquisition and updating of information, user information may be uploaded by the user, an agent of the user (e.g., a brokerage firm, doctor, travel agent, employer, etc.) or others from compatible programs. Conversely, such information can be downloaded into smart cards or other storage devices as desired by the user.

While various implementations of the present invention have been described in detail, it is apparent that further modifications and adaptions of the invention will occur to those skilled in the art. However, it is to be expressly understood that such modifications and adaptions are within the spirit and scope of the present invention.

What is claimed is:

1. A method for use in providing targeted messages to a user of a network, comprising the steps of:
    providing a collection of messages for selective presentation to users of said network;
    in response to receiving a network request, obtaining user information for a particular user of said network, said user information including personal information regarding said particular user;
    obtaining a network address for said particular user of said network whereby messages can be directed to said particular user at said address;
    selecting a targeted message from said collection of messages based on said user information, wherein said targeted message is selected relative to said personal information regarding said particular user so as to increase an effectiveness of said targeted message; and
    presenting said selected targeted message to said obtained network address of said particular user prior to transmission of a network content.

2. A method as set forth in claim 1, wherein said step of providing a collection of messages comprises compiling messages including at least one of advertising and entertainment content.

3. A method as set forth in claim 1, wherein said step of providing comprises downloading a portion of said set of messages.

4. A method as set forth in claim 1, wherein said step of obtaining a network address comprises obtaining one of an internet address and an addressable television network address.

5. A method as set forth in claim 1, wherein said step of obtaining user information comprises accessing a data store including said user information.

6. A method as set forth in claim 5, wherein said step of accessing a data store comprises using the internet.

7. A method as set forth in claim 5, wherein said particular user is associated with a first node of said network and said data store is associated with a second node different than said first node.

8. A method as set forth in claim 1, wherein said step of obtaining user information comprises accessing a record including information concerning internet activities by said particular user.

9. A method as set forth in claim 1, wherein said step of selecting a targeted message comprises determining demographic information regarding said particular user and correlating said demographic information to a demographics target of said targeted message.

10. A method as set forth in claim 1, wherein said step of presenting comprises downloading said selected targeted message to storage associated with a node of said particular user.

11. A method as set forth in claim 1, wherein said step of presenting comprises transmitting a signal to a node associated with said particular user so as to cause said selected targeted message to be presented to said particular user.

12. A method as set forth in claim 1, wherein said step of presenting comprises transmitting a video signal for substantially real time presentation to said particular user.

13. The method of claim 1, wherein the step of presenting said selected targeted message is initiated at a remote network site.

14. A method for use in providing targeted messages to a user of a user addressable network, comprising:
    receiving user information regarding a particular network user from a first data store, wherein said user information is received via the internet;
    determining profile information regarding possible interests of said particular network user based on said user information; and
    selecting, from a set of messages, a targeted message based on said user profile information;
    wherein said selected targeted message is presented to said user prior to presentation of a network content and based on said profile information, thereby enhancing an effectiveness of said selected targeted message.

15. A method as set forth in claim 14, wherein said step of selecting a targeted message comprises determining demographic information regarding said particular user and correlating said demographic information to a demographics target of said targeted message.

16. A method as set forth in claim 14, wherein said first data store is resident on a node of said particular user and said step of receiving comprises accessing said first data store on said user's node.

17. A method as set forth in claim 14, wherein said first data store is resident on a node of said particular network user and said step of receiving comprises accessing said first data store on said separate node.

18. A method as set forth in claim 14, wherein said step of determining profile information comprises obtaining one of financial information, product or service preference information, and user contact information regarding said particular network user.

19. A method as set forth in claim 14, further comprising the step of initiating presentation of said selected targeted message to said user during waiting time of an Internet session between a first time when downloading of one of a web page and a web site is initiated and a second time when downloading is completed.

20. A method for use in providing targeted messages to a user of a network, comprising the steps of:

providing a collection of messages for selective presentation to users of said network;

receiving user information regarding a particular network user from a first data store, wherein said user information is received via the Internet;

determining profile information regarding possible interests of said particular network user based on said user information;

selecting, from said collection of messages, a targeted message based on said user profile information;

obtaining a network address for said particular user of said network; and initiating presentation of said selected targeted message to said user during waiting time of an Internet session between a first time when downloading of one of a web page and a web site is initiated and a second time when downloading is completed.

21. A method is set forth in claim 20, wherein said step of initiating presentation of said selected targeted message is conducted prior to a third time when said selected targeted message is first displayed.

* * * * *